(12) United States Patent
Tuszynski

(10) Patent No.: US 7,072,808 B2
(45) Date of Patent: Jul. 4, 2006

(54) MANUFACTURING DESIGN AND PROCESS ANALYSIS SYSTEM

(76) Inventor: Steve W. Tuszynski, 750 S. Bunky Dr. #304, Los Angeles, CA (US) 90049

( * ) Notice: Subject to any disclaimer, the term of this patent is extended or adjusted under 35 U.S.C. 154(b) by 827 days.

(21) Appl. No.: 10/067,704

(22) Filed: Feb. 4, 2002

(65) Prior Publication Data

US 2003/0176938 A1  Sep. 18, 2003

(51) Int. Cl.
*G06F 17/10* (2006.01)

(52) U.S. Cl. .............................................. 703/2; 700/33
(58) Field of Classification Search ...................... 705/7; 700/33; 702/97; 703/2
See application file for complete search history.

(56) References Cited

U.S. PATENT DOCUMENTS

| | | | | |
|---|---|---|---|---|
| 5,136,686 | A | * | 8/1992 | Koza ............................ 706/13 |
| 5,850,339 | A | | 12/1998 | Giles |
| 6,311,096 | B1 | | 10/2001 | Saxena et al. |
| 6,326,160 | B1 | * | 12/2001 | Dunn et al. .................... 435/14 |
| 6,370,437 | B1 | | 4/2002 | Carter et al. |
| 6,397,114 | B1 | | 5/2002 | Eryurek et al. |
| 6,424,876 | B1 | | 7/2002 | Cusson et al. |
| 6,442,445 | B1 | | 8/2002 | Bunkofske et al. |
| 6,567,752 | B1 | * | 5/2003 | Cusumano et al. ............ 702/34 |
| 6,616,759 | B1 | * | 9/2003 | Tanaka et al. ................. 118/63 |
| 6,760,632 | B1 | * | 7/2004 | Heching et al. ............... 700/33 |

* cited by examiner

*Primary Examiner*—Albert W. Paladini
(74) *Attorney, Agent, or Firm*—Mark J. Spolyar

(57) ABSTRACT

Methods, apparatuses and systems that facilitate the design, production and/or measurement tasks associated with manufacturing and other processes. In one embodiment, the present invention provides an understanding of how the multiple characteristics of a given process output are related to each other and to process inputs. This knowledge facilitates a reduction in measurement costs. It also facilitates an understanding of the sometimes complex interrelationships between design targets, design tolerances, process inputs, process control variables, average process output and variation in the process output. As discussed in more detail below, embodiments of the present invention facilitate 1.) determination of design target values, 2.) determination of design specification limits, 3.) design of process inputs, 4.) determination of process control variable settings, and/or 5.) reduction of measurement costs.

92 Claims, 18 Drawing Sheets

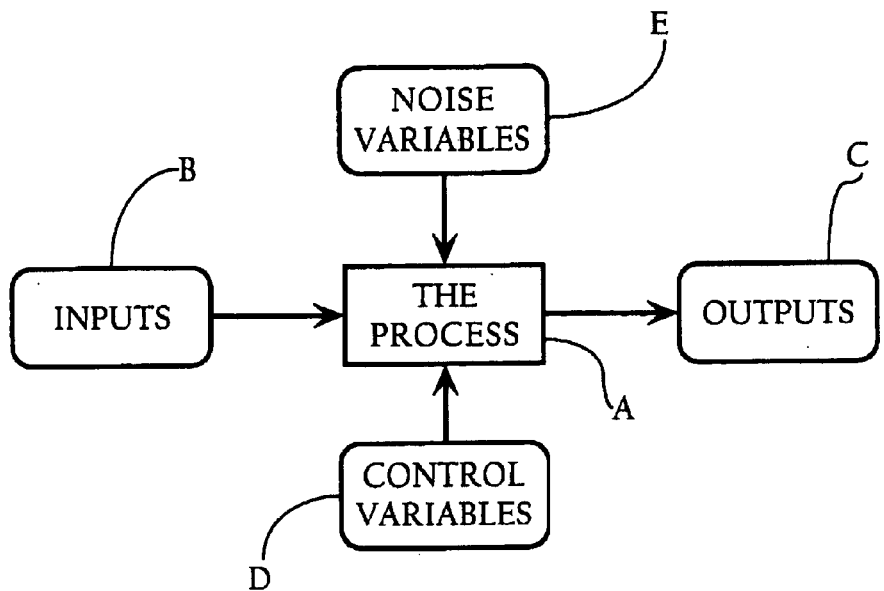
Fig._1
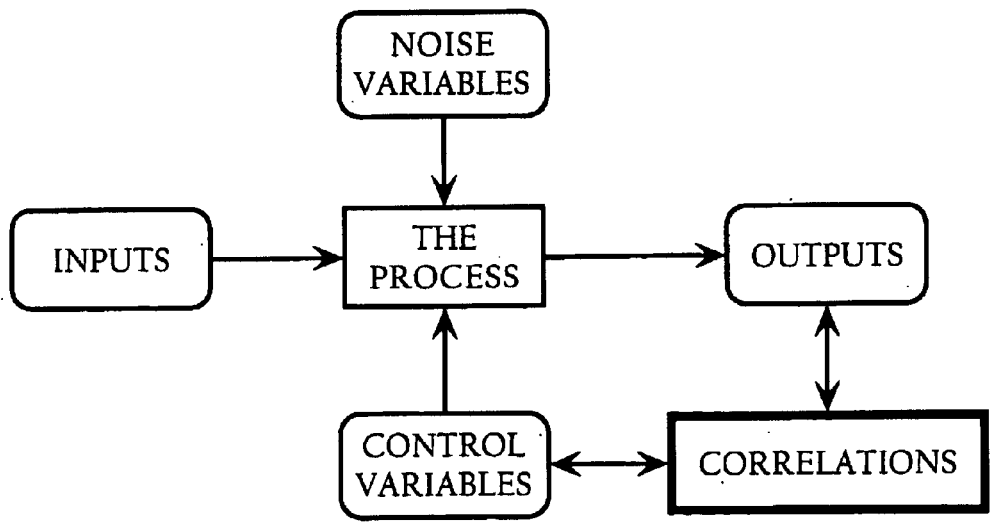
Fig._2

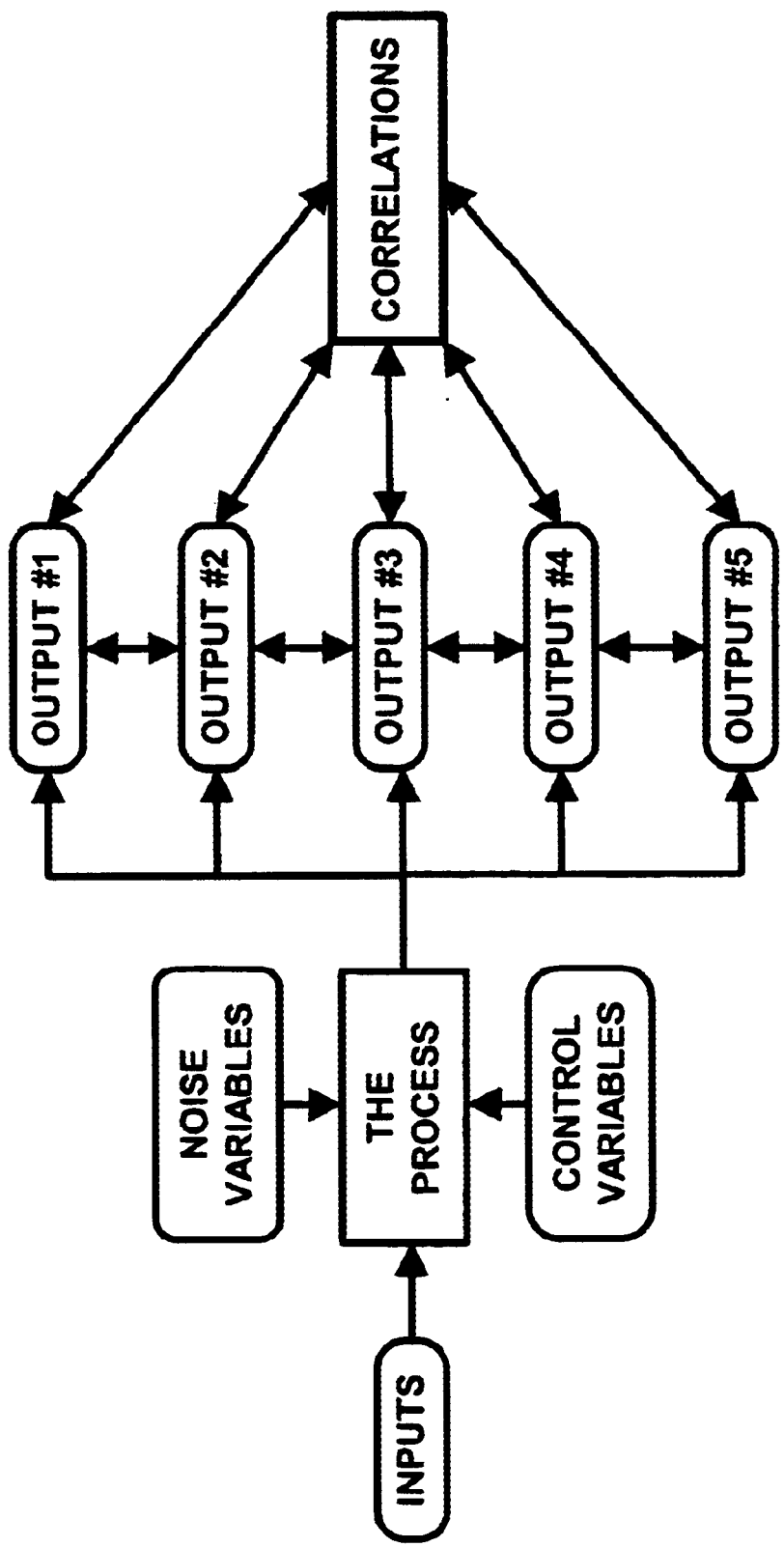
Fig._3

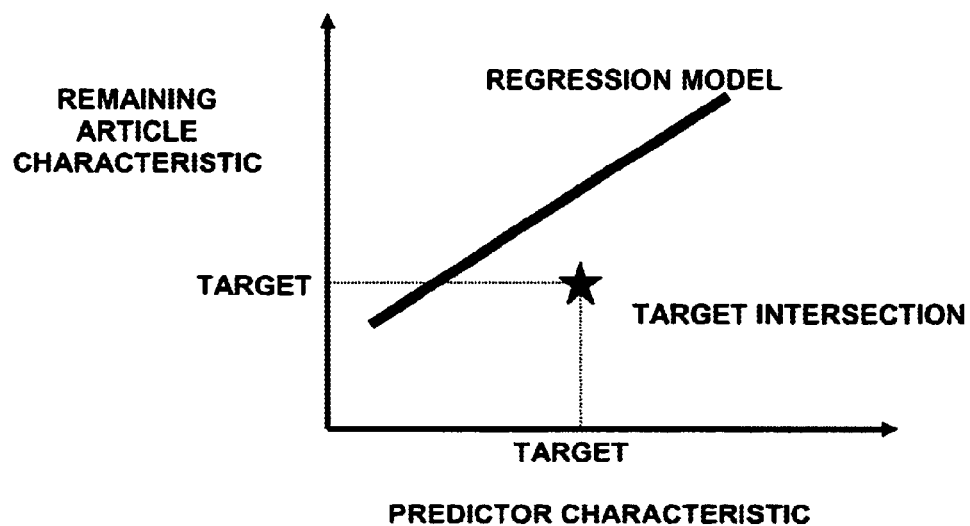
FIG._4
FIG._5
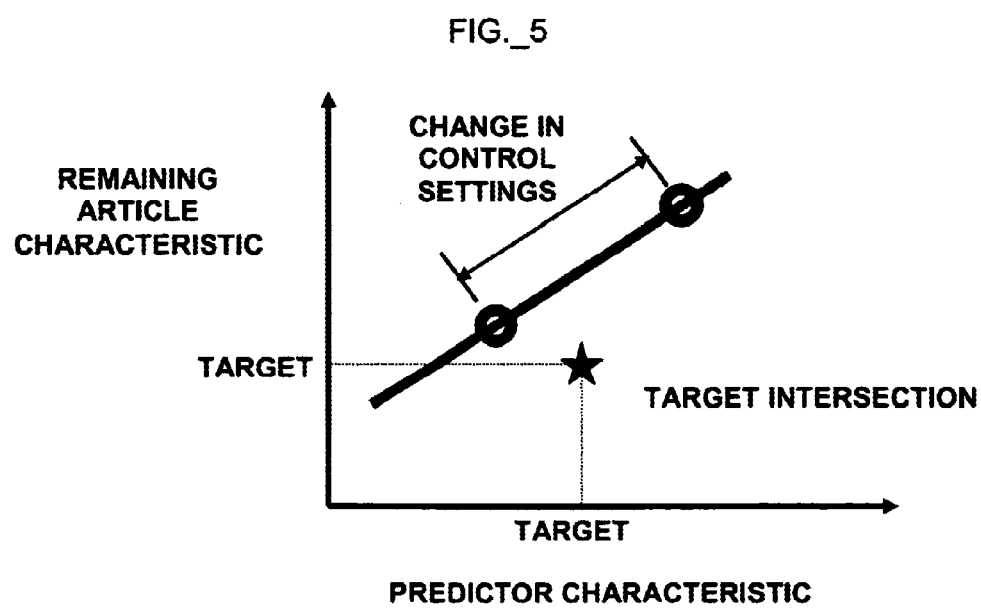

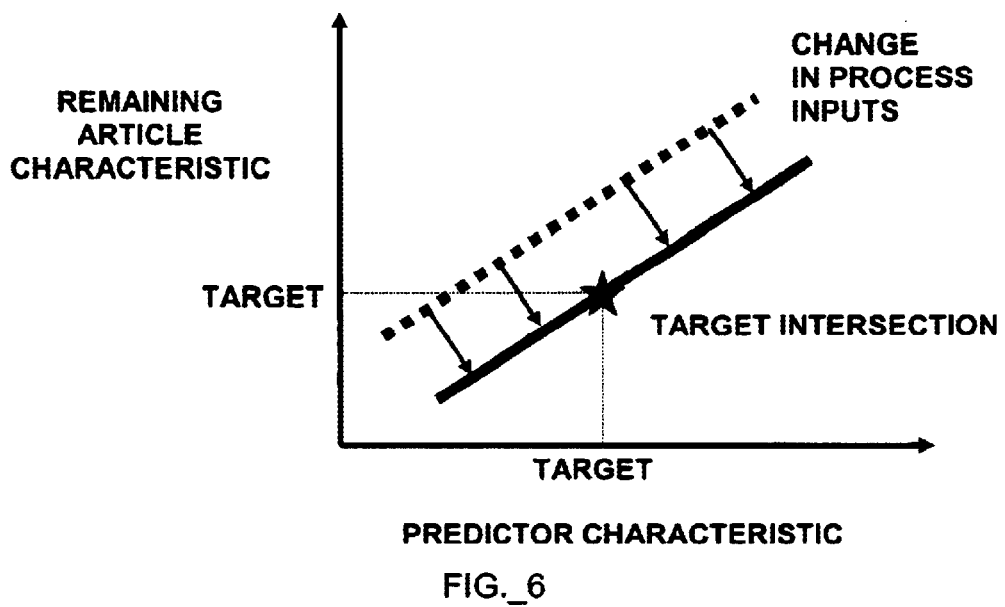
FIG._6
FIG._7
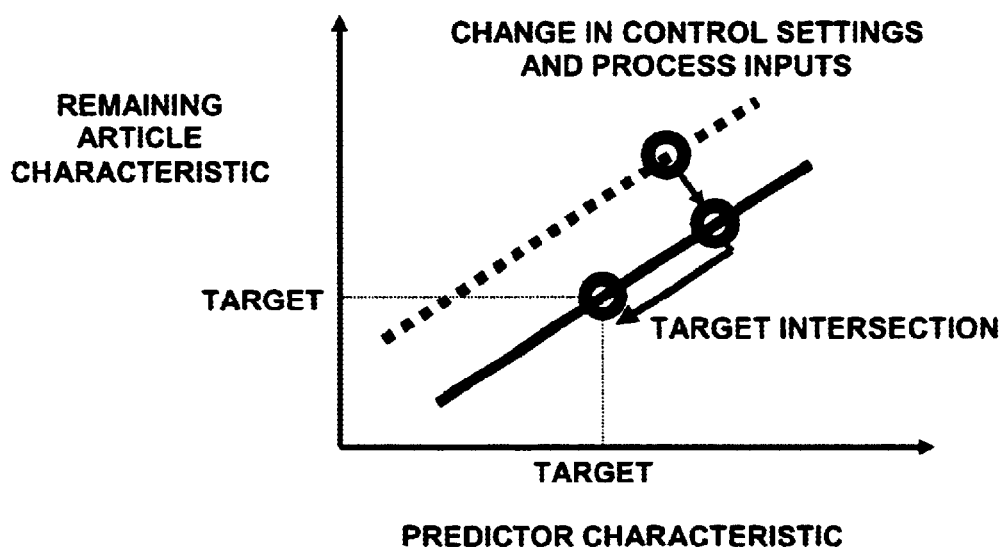

|   | 2 | 3 | 4 | 5 | 6 | 7 | 8 |
|---|---|---|---|---|---|---|---|
| 2 | Row/Col. | Var1 | Var2 | Var3 | Var4 | Var5 | Var6 |
| 3 | 1 | 1 | 2 | 3 | 4 | 5 | 6 |
| 4 | 2 | 2 | 2.9 | 3.8 | 4.7 | 5.6 | 7 |
| 5 | 3 | 3 | 4 | 5 | 6 | 7 | 8 |
| 6 | 4 | 4 | 5.1 | 6.2 | 7.3 | 8.4 | 9 |
| 7 | 5 | 5 | 6 | 7 | 8 | 9 | 10 |
| 8 |   |   |   |   |   |   |   |
| 9 | Correlation | 0.999232 | 0.999232 | 0.997054 | 0.993653 | 0.989203 | 1.000000 |
| 10 | Correlation | 0.997054 | 0.999294 | 0.999294 | 0.997298 | 0.994186 | 0.999232 |
| 11 | Correlation | 0.993653 | 0.997298 | 0.999354 | 0.999354 | 0.997530 | 0.997054 |
| 12 | Correlation | 0.989203 | 0.994186 | 0.997530 | 0.999410 | 0.999410 | 0.993653 |
| 13 | Correlation | 1.000000 | 0.999232 | 0.997054 | 0.993653 | 0.989203 | 0.989203 |
| 14 |   |   |   |   |   |   |   |
| 15 | Average | 0.995829 | 0.997848 | 0.998057 | 0.996673 | 0.993907 | 0.995829 |

FIG._19

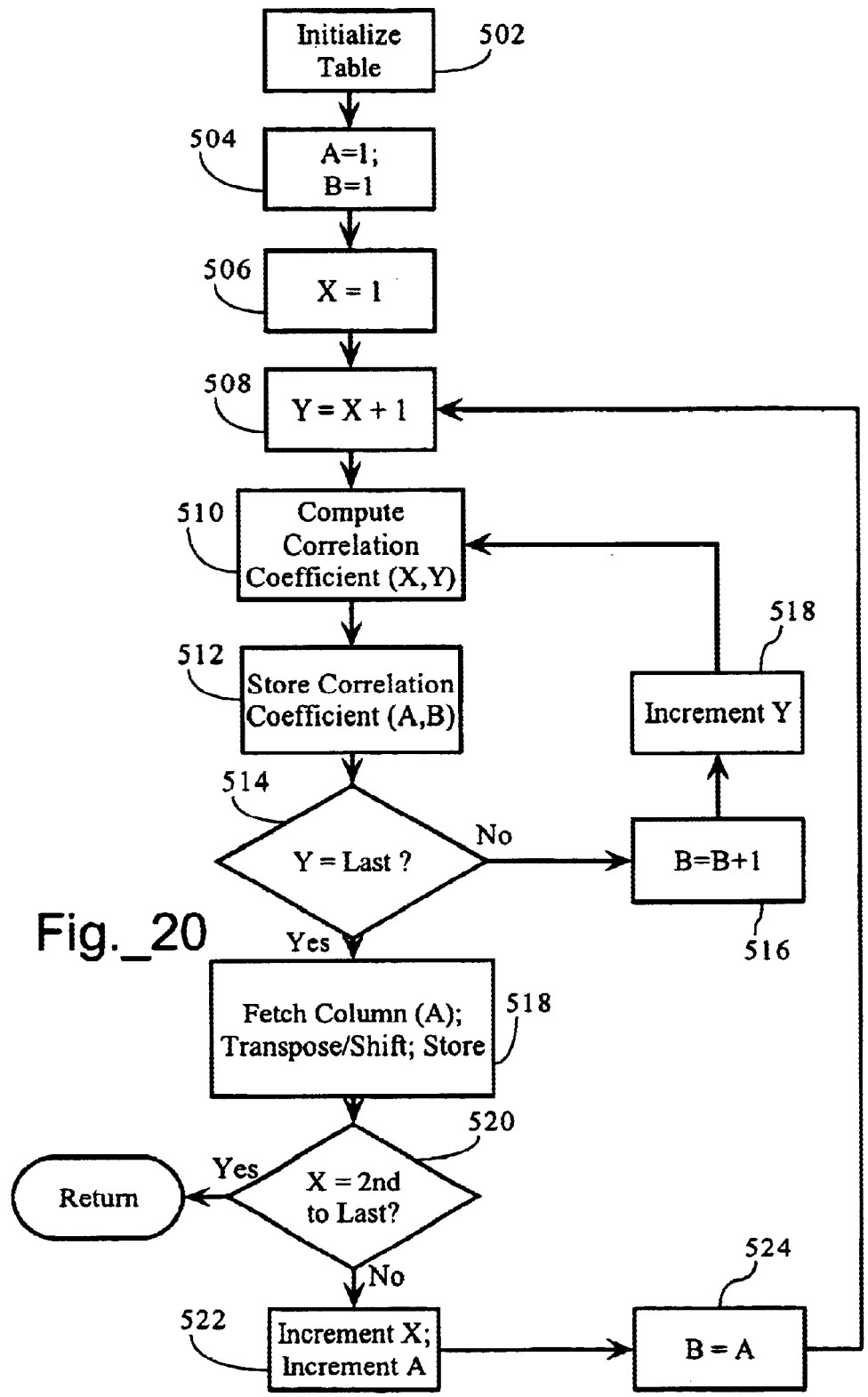
Fig._20

| CAVITY | END | DIM. | P-MIN | P-MAX |
|---|---|---|---|---|
| 1 | LONG | 1.785 | NONE | 1.932 |
| | | 1.925 | 1.924 | 1.934 |
| | | 1.970 | NONE | NONE |
| | | 2.065 | 1.920 | 1.929 |
| 1 | SHORT | 1.785 | NONE | NONE |
| | | 1.925 | 1.921 | 1.938 |
| | | 1.970 | NONE | NONE |
| | | 2.065 | NONE | NONE |
| 2 | LONG | 1.785 | NONE | 1.938 |
| | | 1.925 | 1.921 | 1.938 |
| | | 1.970 | NONE | NONE |
| | | 2.065 | NONE | 1.931 |
| 2 | SHORT | 1.785 | NONE | 1.937 |
| | | 1.925 | 1.923 | NONE |
| | | 1.970 | NONE | NONE |
| | | 2.065 | NONE | NONE |

FIG. 22

MANUFACTURING DESIGN AND PROCESS ANALYSIS SYSTEM

FIELD OF THE INVENTION

The present invention relates to manufacturing, design and process engineering and, in one embodiment, to methods, apparatuses and systems facilitating the design, production and/or measurement tasks associated with manufacturing and other processes.

BACKGROUND OF THE INVENTION

The world of manufacturing, including process engineering, has been under continuous and accelerating pressure to improve quality and reduce costs. This trend shows signs of further accelerating rather than decelerating. From a manufacturing perspective, quality refers to producing parts that 1.) are close to or at engineering design targets, and 2.) exhibit minimal variation. The realm of design engineering has also been under continuous pressure to improve quality and reduce costs. Design engineering must create nominal design targets and establish tolerance limits where it is possible for manufacturing to produce parts that are 1.) on target and 2.) that fall within the design tolerance limits. In-other-words, engineers are tasked not only with designing articles to meet form, fit and function, but with designing them for producibility.

In any manufacturing or other process that depends on the laws of engineering and physics to produce a useful result, there are five fundamental elements (see FIG. 1): 1) the process that makes the product (A); 2) Inputs into the process (B); 3) Output from the process (C); 4) Process control variables adjusted to influence the process output (D); and, 5) uncontrolled process variables that influence the process (E) (e.g., either uncontrollable variables or variables that are left uncontrolled because of time, cost or other considerations, collectively referred to as "noise.").

The traditional approach to producing articles, such as parts or other components, that meet design specifications is a logical one based on a search for causation. This approach is based on the principle that, control over the variables that influence a process yields control over the output of that process. In-other-words, if one can control the cause, then one can also control the effect. FIG. 2 illustrates this prior art principle, where an attempt is made to determine the relationships, linkages, or correlations between the control variables and the characteristics of the output (e.g., manufactured parts).

Unfortunately, many manufacturing processes act like a black box. It can be difficult in some of these cases to determine the relationship between the process control variables and the resulting article characteristic values. Furthermore, time and economic constraints can make such a determination impractical even when this might be technically possible.

Plastic injection molding is an example of this situation. With at least 22 control variables, even when these control settings have only two levels each (a high and a low temperature, a high and a pressure, etc.), there are nevertheless over 4 million possible combinations. Indeed, there are billions of possible combinations when three levels (high, medium and low settings) are considered. Furthermore, changes to process variables may have varying effects on the resulting article characteristics; for example, increasing a pressure setting can increase a first article characteristic, decrease a second, and not affect a third. Simple interactions, complex interactions and non-linearities complicate the situation further. Further, there are usually multiple mold cavities in a single mold. Finally, there are numerous article characteristics (dimensional, performance, or other requirements) that must be met. In light of the preceding, it is often extremely difficult to establish the combination of factors from the large number of part design targets, part tolerance limits, mold design characteristics and injection molding press settings that produces acceptable articles.

Some progress has been made in this regard. Design of Experiments (DOE) methodology greatly reduces the number of experiments that must be conducted to understand the impact of a selected subset of control variables on the resulting output of a process. Unfortunately, even after performing a designed experiment, there are still a large number of control variables that can affect the resulting articles. In any event, extensive measurement of produced parts is still conducted by both the supplier and the OEM customer to ensure that acceptable articles are produced.

In addition, there are two main paths to achieving improved manufacturing quality. The first is to measure the parts after they are produced and then compare the parts to specification requirements (design targets and tolerances). This is an "on-line" process utilizing feedback. The parts are usually measured, to some extent, by both the producer and the customer (OEM, first tier manufacturer, second tier manufacturer, etc.). Measuring the parts, recording and analyzing the data, and reporting the results, however, is a very expensive and resource consuming process.

In their efforts to improve quality, many manufacturers have begun to use the techniques of Statistical Process Control (SPC) and Process Capability studies. Indeed, many customers require their suppliers to perform SPC or other equivalent measurement, recording, analysis and reporting procedures. According to this technique, samples are taken from the production line, measured and then analyzed to see if any abnormal (not normally distributed) patterns or data points emerge. If such abnormal data points are detected, the process is considered "out-of-control" (i.e., failing to yield a consistent predictable output) and production is immediately stopped to fix the process. The measurement data from manufactured parts is analyzed using sophisticated SPC statistical methods and charting tools embodied in specialized computer programs. Since most parts have many different dimensions, measurement and SPC analysis have usually been applied to a large number of part dimensions for each part, increasing the time and expense associated with production. However, SPC is far less expensive in the long run than shipping unacceptable parts and/or having to sort acceptable parts from unacceptable parts.

It has also been difficult for manufacturers (and their customers) to determine 1.) what percentage of the dimensions should be monitored using SPC and 2.) which dimensions should be measured if the full set of dimensions is not monitored. Usually, most, if not all, of the "critical" dimensions called out by the design engineer are measured and analyzed using SPC techniques. However, economic constraints can result in fewer than the desired number of dimensions being measured and analyzed. Guesswork is then frequently involved as to which dimensions to select for SPC or other analysis.

A second path to improving manufacturing quality is by reducing the natural variation in the manufactured articles. The accuracy of maintaining the process control factors can be improved and/or the "noise" factors can be eliminated or minimized. This is an "off-line" process improvement using feedforward. Reducing natural variation is also an expensive proposition since many relatively small common causes of variation are present. The degree to which the natural variation in the parts produced must be reduced is usually determined through expensive process capability studies, usually conducted on each "critical" dimension.

In light of the foregoing, a need in the art exists for methods, apparatuses and systems facilitating design and manufacturing processes and, more particularly, addressing the problems discussed above. For example, a need in the art exists for methods and systems that allow for reductions in time and cost associated with the measurement, recording, analysis and reporting processes discussed above in connection with, for example, SPC studies, Process Capability studies, shipping inspection and receiving inspection. A need in the art exists for methods to determine how to adjust inputs to a process in order to achieve the desired outputs. A need in the art also exists for methods and systems facilitating a determination of how many article characteristics (e.g., dimensions, performance measures, etc.) should be measured for a given process. Lastly, a need in the art exists for methods and systems that enable an assessment of which article characteristics should be measured for a given process. As discussed in more detail below, embodiments of the present invention substantially fulfill these needs.

SUMMARY OF THE INVENTION

The present invention provides methods, apparatuses and systems that facilitate the design, production and/or measurement tasks associated with manufacturing and other processes. In one embodiment, the present invention provides an understanding of how the multiple characteristics of a given process output are related to each other and to process inputs. This knowledge facilitates a reduction in measurement costs. It also facilitates an understanding of the sometimes complex interrelationships between design targets, design tolerances, process inputs, process control variables, average process output and variation in the process output. As discussed in more detail below, embodiments of the present invention facilitate 1.) determination of design target values, 2.) determination of design specification limits, 3.) design of process inputs, 4.) determination of process control variable settings, and/or 5.) reduction of measurement costs.

The present invention uses analytical techniques to accomplish the preceding objectives and advantages. As discussed below, graphical techniques, in one embodiment, can optionally be used in place of analytical techniques. Graphical techniques, including but not limited to charts, graphs, and plots, can also be used to display analysis results. The present invention employs powerful statistical methodologies that, in one embodiment, allow for a determination of which and how many article characteristics should be measured, potentially reducing the cost and resource expenditure associated with measurement, recording, analysis and reporting. Embodiments of the present invention also assist design engineers in designing articles for producibility. Embodiments of the present invention can also be configured to provide critical information necessary for design engineers and tooling engineers to modify design requirements for process inputs in order to make it possible for manufacturing to hit design targets and stay within specification tolerance limits. Embodiments of the present invention can also be employed to identify, using a systems engineering approach, which article characteristics have the most restrictive targets and specification tolerance limits. Such information, for instance, allows for an evaluation of whether or not tolerances should be increased and, if so, which tolerances and on which article characteristic. The present invention can also be employed to reduce the cost of performing process capability studies by reducing, in some cases dramatically so, the number of process capability studies that must be conducted. These and other aspects of the present invention will be become apparent from the following description of preferred embodiments of the present invention.

DESCRIPTION OF THE DRAWINGS

FIG. 1 is a process flow diagram generally applicable to manufacturing and other processes.

FIG. 2 is a process flow diagram illustrating a concept associated with application of prior art process control techniques to manufacturing processes.

FIG. 3 is a process flow diagram illustrating a concept associated with the present invention as applied to manufacturing processes.

FIG. 4 is a scatter diagram setting forth a regression model between two article characteristics.

FIG. 5 is a scatter diagram modeling the effect a change in process control settings has on process output.

FIG. 6 is a scatter diagram illustrating the effect of changing process inputs.

FIG. 7 is a scatter diagram illustrating the combined effect of changing process control settings and process inputs.

FIG. 19 is a spreadsheet table including a set of article characteristic values as to a plurality of article characteristics, correlation coefficients and a value indicating the predictive capability of each article characteristic.

FIG. 20 is a flow chart diagram providing a method allowing for population of a correlation coefficient table.

FIG. 22 illustrates a constraint table according to an embodiment of the present invention.

DESCRIPTION OF PREFERRED EMBODIMENT(S)

Figure 8:
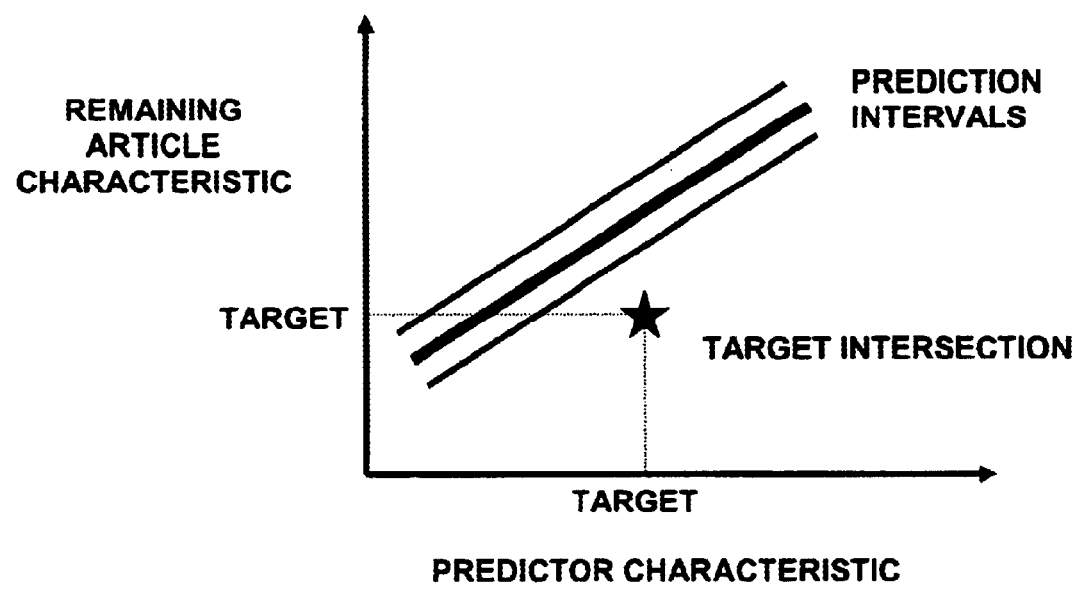
FIG. 8 is a scatter diagram including prediction intervals associated with a regression model.

I. Background and Operating Principles
A. Principles and Concepts

The present invention utilizes several graphical, statistical and mathematical techniques directed to analyzing the relationship between article characteristics to achieve a novel design and manufacturing process analysis system. Among these are scatter diagrams, correlation coefficients, coefficients of determination, linear, non-linear and multi-variate regression, prediction intervals, adjusted prediction intervals, prediction using regression, prediction using prediction intervals, DOE, averages and weighted averages. FIG. 3 is a process diagram illustrating how an aspect of the present invention differs from prior art techniques. In a wide variety of manufacturing processes, and injection molding in particular, there is often a strong relationship between article characteristics resulting from a given process. The present invention assesses the statistical strength of these relationships and, when they are sufficiently strong, capitalizes on their existence to facilitate a variety of design, production and measurement tasks associated with manufacturing processes.

In understanding the difference between the prior art exemplified in FIG. 2 and the present invention exemplified in FIG. 3, it should be noted that the primary focus of FIG. 3 is the relationship that exists between the part characteristics. In the field of injection molding, the different outputs (#1, #2, etc.) in FIG. 3 would typically refer to different part dimensions. In the present invention, the different part characteristics are not limited to dimensions, but could be any part attribute. In addition, the different part characteristics may in fact include the same dimension across different parts produced in a single cycle of a multi-cavity mold.

FIG. 4 graphically illustrates the relationship between two article characteristics as set forth on a scatter diagram. FIG. 4, in one form, illustrates the relationship between a predictor characteristic and predicted characteristic. As discussed below, the data points used to generate the regression model are typically generated using at least two different methods.

The first method consists of generating parts with no changes made to the process settings. This generally corresponds to a normal production run. All processes are subject to variation in control variables, environmental conditions, wear and tear, and many other factors. These influences on the process cause natural variation in the process output. The process output from this method is then measured. One problem with this method is that the process of measurement is like any other process in that the measurement process has its own source of variations which result in measurement error. If the size of the natural variation in the part characteristics is small relative to measurement error, then the measurement error will overwhelm the natural variation. In this instance, it is unlikely that any statistically significant correlations could be established between the part characteristics.

Injection molding processes typically have relatively small natural variations as compared to typical measurement error. Consequently, the first method of generating injection molded parts for evaluation of relationships can be unproductive. Consequently, the second method for generating parts is more applicable for injection molded parts. However, other processes may exhibit sufficient natural variation in order to use the above-identified method.

According to a second method, variation in part characteristics is induced. In the case of injection molding, variation is induced by deliberately changing process control settings. In this manner, the variation in part characteristic values becomes large relative to measurement error. Correlations, to the extent that they exist, then become apparent.

As previously mentioned, DOE is a method that assists in reducing an unmanageably large number of experimental conditions down to a manageable few experimental conditions. Since variation must be induced in the field of injection molding, there is utility in using DOE techniques to design an efficient experiment. Use of this method has further utility in that there are commercially available computer applications that efficiently analyze the data and report the results of the analysis. Thus, one beneficial by product of using DOE, is that useful information may be extracted from an experimental run. In particular, it is usually possible to identify at least one process control setting that can be used to significantly affect the part characteristics of resulting output. The information obtained from DOE has utility as it can be used to adjust a process control setting to achieve a desired change in the joint operating position of the part characteristic values along the regression model, as explained below.

There is a second advantage to inducing variation in an experimental run that is not connected with any efficiency measure associated with using DOE. This second advantage lies in the fact that the present invention, in one embodiment, identifies the process control settings that have the greatest impact or influence on the part characteristics. The present invention may also rely, in part, on the experience of the injection molding press operators and associated manufacturing and process personnel to select those "high impact" control settings. It should be noted that in injection molding, the usual paradigm is to minimize changes to the press settings. In contrast, the present invention seeks to maximize their impact for purposes of inducing part variation for further analysis. In-other-words, for the purpose of inducing variation, the present invention seeks out the "worst" control settings. The "worst" control settings from a production perspective become the "best" control settings from the perspective of inducing variation.

As previously noted, there are a large number, typically 22 or more, process control settings in the field of injection molding. The present invention, in one embodiment, incorporates "scientific" or "decoupled molding" principles to identify the high impact press controls. As with DOE, it is not necessary to use "scientific"/"decoupled molding" principles, but it potentially provides additional identification advantages. Thus, when several, typically 3–5, of the highest impact control settings are changed in the experimental run, the greatest amount of variation will be introduced into the part characteristics. This variation will be of two types. The first will be a translation of the joint operating position along the regression line. The second may induce scatter of the data points about the regression line. It is important to create a robust data set to yield, in turn, a robust regression model for prediction.

Finally, the use of DOE techniques provides additional information. Specifically, the use of DOE techniques to induce part variation further allows for an understanding of how the process control variables that were changed affect part characteristics and potentially how these control variables interact with each other.

As previously discussed, it is difficult to establish the relationship between injection molding control settings and part characteristics for several reasons including the large number of control variables, the potentially large number of part characteristics, simple interactions, complex interactions, non-linearities and other effects. One of the great utilities of this invention is that even though there may be many process control variables that influence a part characteristic, and those changes may influence any one part characteristic in a very complex manner, changes in these variables have a predictable effect on the relationship between the predictor characteristic and at least one remaining article characteristic. Accordingly, as discussed in more detail below, the systems and methods of the present invention allow design engineers and process operators to rely on the values of a predictor characteristic in order to determine whether one or more predicted characteristics complies with design specifications. In addition, the systems and methods of the present invention allow design engineers and process operators to focus on the predicted characteristic in efforts to adjust process output to comply with design specifications. These and other advantages will become apparent from the description provided below.

Figure 10:
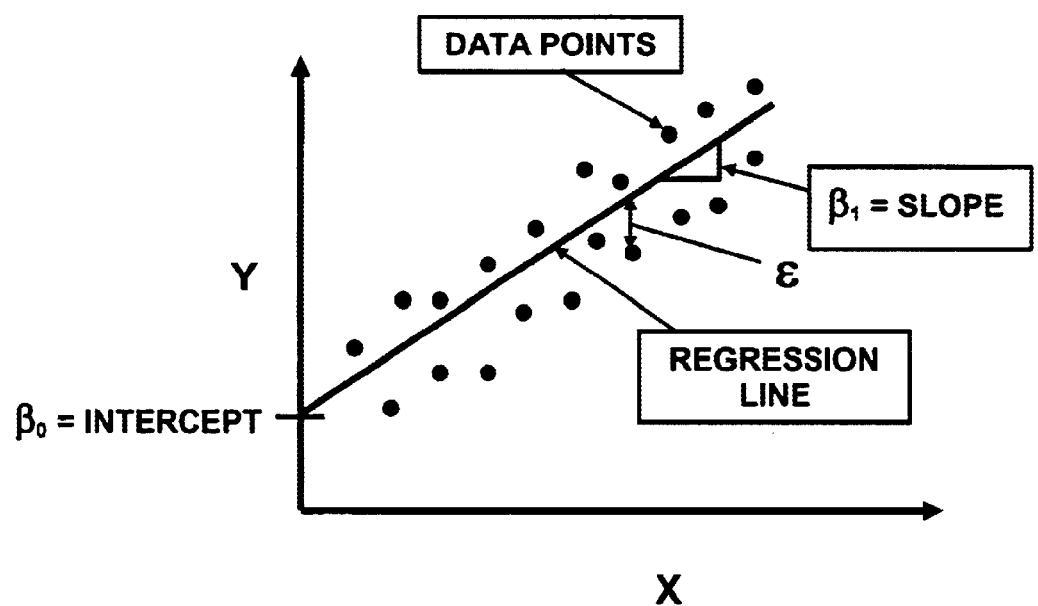
FIG. 10 is a diagram of a simple linear regression model between two article characteristics.

The regression model of FIG. 4 assumes a straight-line relationship between the two variables with all data points being on the straight line; however, a perfectly linear model is seldom achieved because perfect correlation is rare in the real world. FIG. 10 illustrates the scatter of data points on a scatter diagram. Although the data points exhibit scatter, they also indicate a strong trend or relationship. In other words, by knowing the value of one of the two variables, it is possible to predict the other variable with a relatively high degree of accuracy. As applied to the present invention, knowledge of the value of the predictor characteristic can yield reasonably accurate knowledge of the value of the predicted article characteristic. In practice, scatter among the data points is caused by a number of factors. These include variations caused by common cause noise, common cause fluctuations in control variables, common cause variations in the process inputs and common cause variations in the measurement system used to measure the part characteristics. FIG. 10 also illustrates two parameters that are typically used to define the regression model. These are the slope of the regression line and the Y-intercept; however, other parameters can be used. The embodiment shown in FIG. 10 also illustrates a linear regression model. The present invention, however, is not limited to the use of a linear model. A non-linear regression model, such as a multivariate model can also be used in connection with the present invention.

FIG. 8 illustrates the addition of upper and lower prediction intervals to the regression model. The area bounded by the prediction intervals represents the feasible area of output of the process, as to the x-axis and y-axis characteristic, when natural variation and measurement error are included. In-other-words, all of the complexities of the process are "eliminated" since they show up as the bounded area of feasible output. The complexities that are "eliminated" include the aforementioned process control variable simple interactions, complex interactions, non-linearities, etc.

Analysis of process output in this manner provides a variety of useful information facilitating design and manufacturing processes. For example, FIG. 4, as well as others, also contains a representation of the intersection between the design target for the predictor characteristic and the predicted characteristic. Location of the target intersection provides a great amount of useful information to design engineers and process operators, as it illustrates that, for situation illustrated by FIG. 4, it is impossible to intersect the target intersection no matter how the process control settings are changed.

For didactic purposes, the description of preferred embodiments primarily details application of an embodiment of the present invention to injection molding processes. The present invention, however, has application to a variety of manufacturing processes, such as plating, semiconductor manufacturing, machining, and any other process where material is added, subtracted, or otherwise changed in form or structure. In addition, the present invention can be applied to aid the design of a manufactured article, the development of a process to manufacture the article, and/or the reduction of measurement costs. Moreover, the present application has application to a variety of articles, including stand-alone articles or items, as well as articles intended as components, elements or parts of a combination. Accordingly, the description of the preferred embodiments set forth herein refers to "articles" and "parts" interchangeably.

The present invention also has application in assessing the impact of sources of variation other than variation caused by changes in press control settings. Virtually any source of variation, if it causes sufficient variation in the part characteristic value, can be assessed. Selected examples could include determining the effect of setup-to-setup variation, determining the effect of press-to-press variation for injection molding, determining temporal effects such as the impact of seasonal effects and assessing the impact of different types of raw material or the impacting of purchasing either raw material or components from different suppliers.

In addition, embodiments of the present invention can be performed without the aid of a computing device, such as a personal computer, to perform various mathematical and statistical computations set forth herein. For a small number of article characteristics, it is entirely feasible to do all of the analysis and/or graphing by hand and/or with a spreadsheet. In a preferred embodiment, however, given the large amounts of data and computational requirements, various operations associated with the present invention are performed with a computing device configured to execute the operations described herein and display resulting data on a user interface display.

B. Exemplary System Architecture

Figure 15:
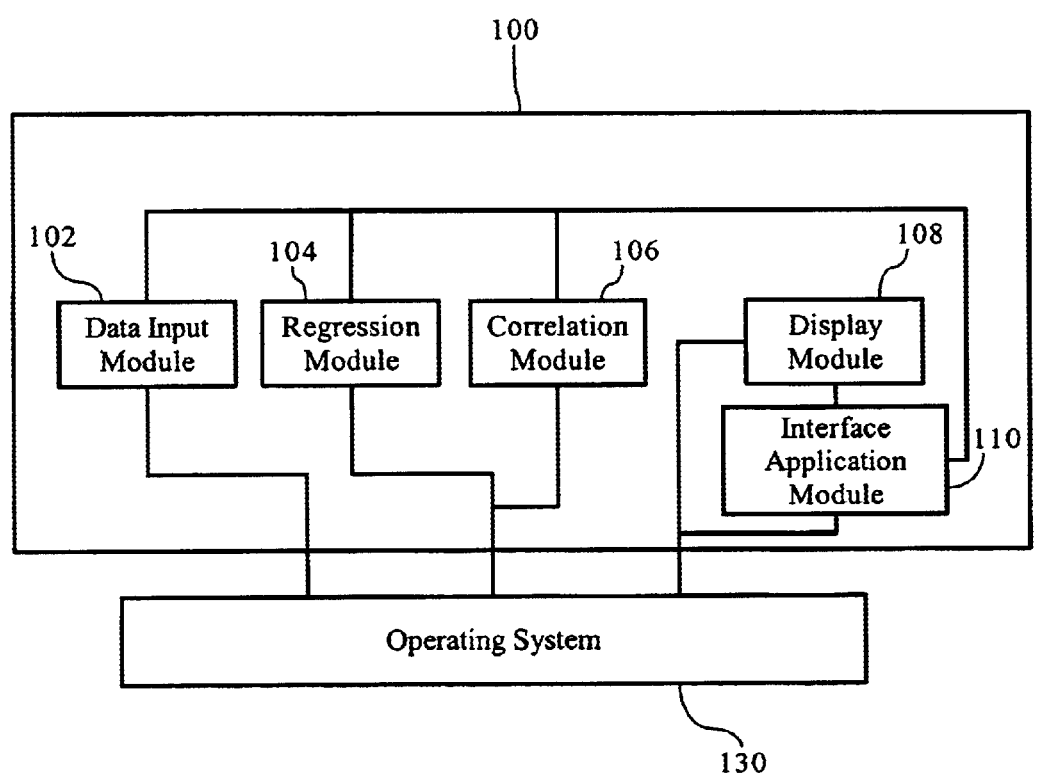
FIG. 15 illustrates a system architecture according to an embodiment of the present invention.

FIG. 15 is a simplified block diagram illustrating a system architecture according to one embodiment of the present invention. As FIG. 2 provides, a system architecture includes process analysis application 100 and operating system 130. Process analysis system 100 includes data input module 102, regression module 104, correlation module 106, display module 108, and interface application module 110. Data input module 102 is operative to receive article characteristic data, as well as format and store the data in a suitable format for operation by other modules associated with process analysis application 100. Regression module 104 is operative to compute a regression model given a set of inputs. Correlation module 106 is operative to perform operations relating to the correlations among article characteristics as more fully described below. Display module 108, in one embodiment, is operative to generate graphical displays of regression and/or correlation relationships for a given set of data, as well as other data elements as more fully described below. Interface application module 110 is operative to coordinate operation of the other modules associated with process analysis system 100 based on commands received from a user.

Figure 11:
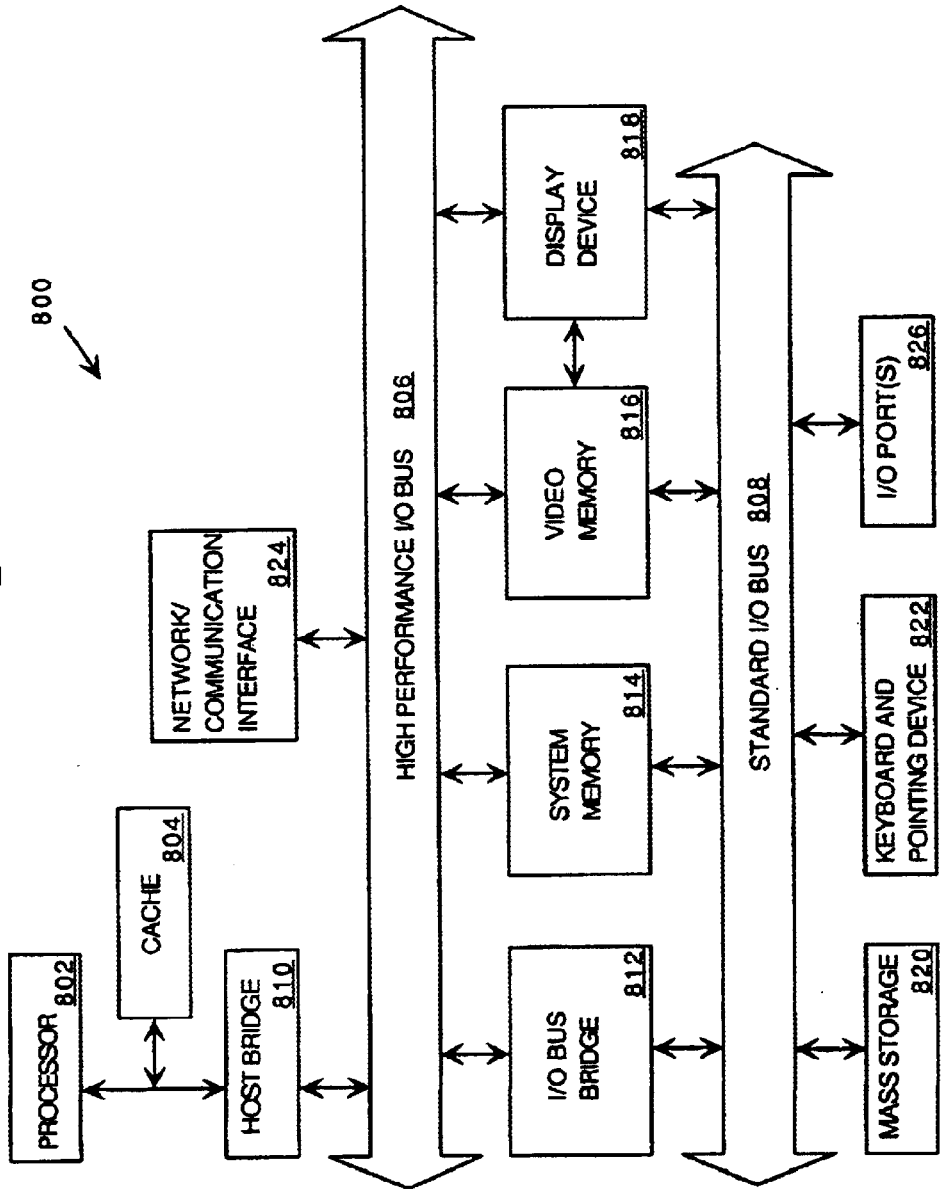
FIG. 11 is a functional block diagram illustrating an embodiment of a computer hardware system suitable for use in connection with the present invention.

In one embodiment, the above-described system architecture operates in connection with computer hardware system 800 of FIG. 11. Operating system 130 manages and controls the operation of system 800, including the input and output of data to and from process analysis application 100, as well as other software applications (not shown). Operating system 130 provides an interface, such as a graphical user interface (GUI), between the user and the software applications being executed on the system. According to one embodiment of the present invention, operating system 130 is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 11 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, network/communication interface 824 is used to provide communication between system 800 and any of a wide range of conventional networks, such as an Ethernet, token ring, the Internet, etc. Mass storage 820 is used to provide permanent storage for the data and programming instructions to perform the above described functions implemented in the system controller, whereas system memory 814 is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the elements of the present invention are implemented as a series of software routines run by hardware system 800 of FIG. 11. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language and stored in compiled form on mass storage device 820. However, these routines may be implemented in any of a wide variety of programming languages, including Visual Basic, Java, etc. In alternate embodiments, the present invention is implemented in discrete hardware or firmware. For example, an application specific integrated circuit (ASIC) could be programmed with the above described functions of the present invention.

II. Operation of Exemplary Embodiments

A. Generating a Set of Articles Having a Range of Variation as to a Plurality of Article Characteristics As described above, the present invention assesses the relationship between article characteristics associated with a set of articles having a range of variation as to the article characteristics. According to one embodiment of the present invention, a user generates a set of parts having a range of variation as to a plurality of article characteristics according to a given process. For example, a user may install an injection molding tool in an injection molding machine and produce a set of articles. The set of articles, or a sample thereof, are then measured or otherwise inspected or assessed as to the article characteristics of interest. The resulting set of data is then recorded (e.g., such as in an Excel spread sheet table) and used for subsequent analysis.

A variety of article characteristics can be measured and analyzed. For example, measured or otherwise determined article characteristics can include the dimensions of the article (e.g., length, height, width, circumference, overall diameter, etc. of the article or a given feature of the article), hardness, porosity, bowing, smoothness, void characteristics (whether voids exists and their number), color, strength, weight, and any other article characteristic, including performance characteristics such as the spray pattern of a nozzle or flow rate through a hydraulic restrictor.

As discussed above, the present invention can be applied to a set of articles where variation of the article characteristics occurs naturally or is induced by varying process control variables associated with the process that creates the article. When articles are produced with unchanged process control settings, there is typically little natural variation in the resulting article characteristics. This is particularly true for injection molded plastic parts. Measurement error may obscure or otherwise render unreliable the natural variation observed from a given set of articles. If it is not cost effective to use more precise measuring instruments, then variation should be induced in the parts by varying process settings. Accordingly, in a preferred embodiment, article variation is induced when measurement error is large compared to natural part variation.

A.1. Inducing Variation

Article variation can be induced by selecting and varying press settings based on the experience of the operator. That is, the operator can use his experience to determine which process settings to change in order to induce variation in the parts. To induce variation in a preferred form, the operator varies the process settings during the manufacturing process and allows the process to come to equilibrium between setting changes before selecting parts for measurement. In addition, the operator in a preferred embodiment of the method selects the set or subset of process settings that induce the greatest variability in the article characteristics of interest. In a preferred embodiment, the upper and lower limits for the process settings are chosen such that the process produces parts without harming the process equipment or tooling. Moreover, in a preferred form, the magnitude of the changes in process settings is chosen to induce variation across the full range between the article characteristic upper and lower specification limits for each of the article characteristics of interest.

As to injection molding processes, part variation, in one embodiment, may also be induced by selecting and varying process control settings using scientific/decoupled molding techniques. Scientific/decoupled molding techniques provide a method of reducing the large number of press settings down to three or four key variables. Furthermore, scientific/decoupled molding techniques can be used in conjunction with the experience of the mold press operator to determine which press settings should be varied. In a preferred embodiment, the set of articles produced comprises articles from an adequate number of repetitions at each set of process control variables.

In a preferred embodiment, Design of Experiments (DOE) methodology is employed to generate a set of articles having a range of variation. DOE can be used irrespective of whether the determination of which process settings to vary is made using operator experience, decoupled/scientific molding principles, or some combination thereof. DOE defines efficient experimental setups that allow the extraction of the maximum amount of information for a relatively small experimental effort. Once it has been determined which press settings to change, DOE defines efficient experimental setups that allow the extraction of the maximum amount of information for a relatively small experimental effort. This applies to both the design of the experiment (e.g., combinations of process settings, and the number of replications at each combination, etc.) and to the analysis of the data. A wide variety of known DOE techniques and available software tools can be used to design the experimental run that induces part variation.

As discussed in more detail below, the use of DOE to produce a set of articles for analysis provides "bonus" information that can be used, after analysis according to the present invention, to move a given article output closer to target and to reduce variation in the articles. For example, such information allows the operator to adjust press settings to accomplish the following during production: 1) move product output to target, and/or 2) minimize product variation, and/or 3) minimize cost, and/or 4) minimize press cycle time.

A.2. Receiving Article Characteristic Values

In one embodiment, the present invention is implemented by a computing device (such as a special-purpose or general purpose computer) configured to execute the functionality described herein. After a given set of articles is produced and article characteristics are measured, in a preferred form, a suitably configured computing device, executing data input module 102, receives the article characteristic values associated with the set of articles and stores them in memory.

Figure 9:
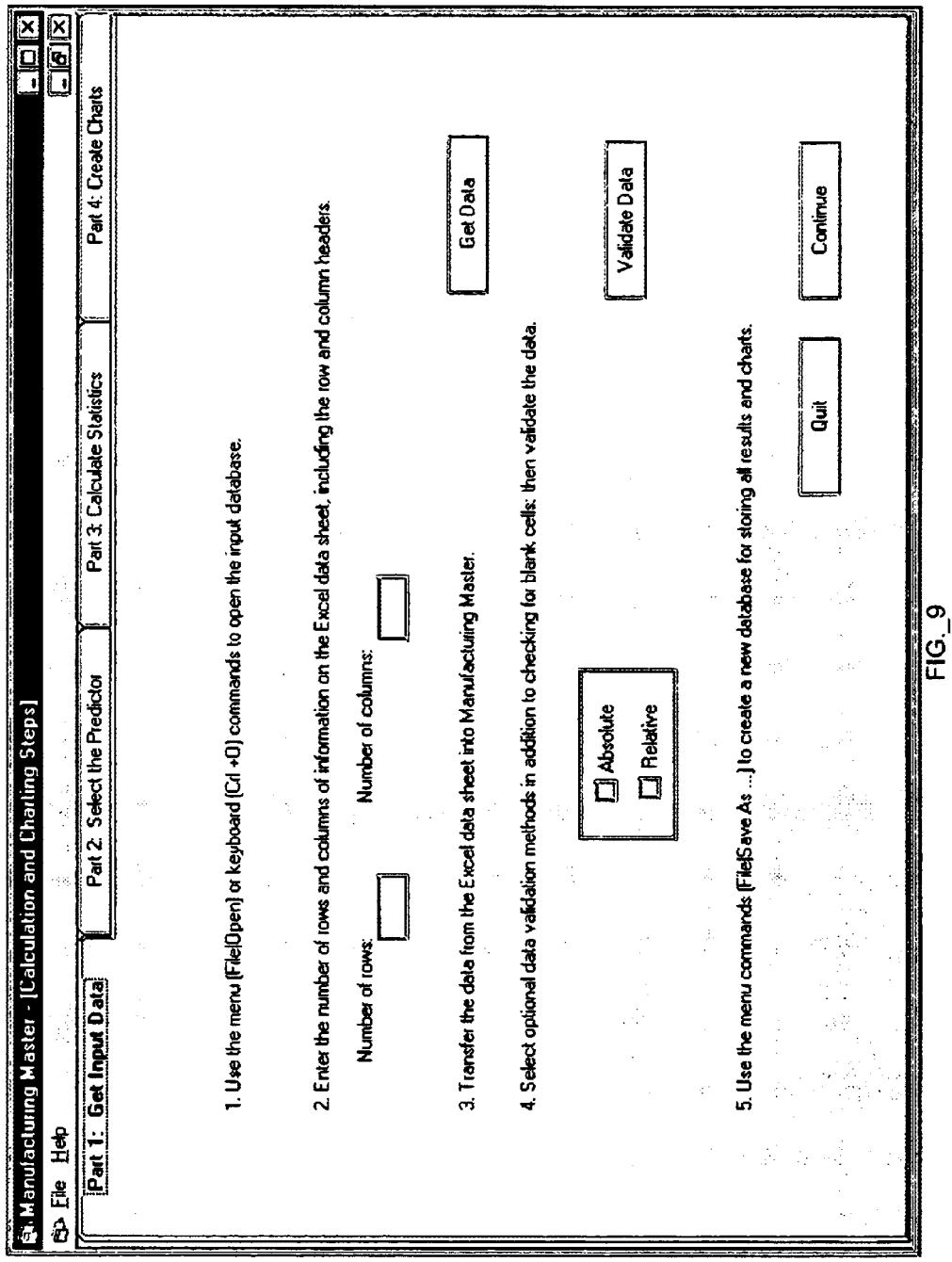
FIG. 9 provides a graphical user interface facilitating the input of article characteristic data used in connection with an embodiment of the present invention.

FIG. 9 sets forth a graphical user interface provided by an embodiment of the present invention that allows a user to input a set of article characteristic values. As FIG. 9 illustrates, an embodiment of the present invention allows the user to open a data input database and manually provide the set of article characteristics into a table. One embodiment, however, allows the user to import article characteristic value data stored in various file formats, such as in an Excel® spread sheet table, or any other suitable file format. In one form, data input module 102 is further operative to validate the data set, such as checking for blank cells and other validation methods.

In addition, as discussed below, data input module 102 is operative to receive other data associated with operation of embodiments of the invention. For example, data input module 102 is operative to receive target values, as well as upper and lower specification limits, for all or a subset of article characteristics. In one embodiment, such data is used to provide users the ability to assess the relationship between process output and design specifications for a given set of process inputs.

B. Assessing Relationship Between Article Characteristics

To allow for an assessment of the relationship between article characteristics associated with a set of articles, process analysis application 100, in one implementation, generates a set of scatter diagrams each based on a pair of article characteristics. See FIG. 10. The set of scatter diagrams can represent all possible combinations of article characteristics, or it can consist of a subset of all possible combinations.

In one embodiment, display module 108 generates graphical displays including scatter diagrams for presentation on display device 818 to allow the user to visually assess the degree of correlation between article characteristics. See FIG. 10. In one form, the graphical user interface presented on display device 818 allows the user to select, using keyboard and pointing device 822, a first article characteristic for the x-axis and successively view the scatter diagrams based on the first article characteristic and the remaining article characteristics on the y-axis. The user can use the information gleaned from this visual inspection to assess the capability of the first characteristic to be an adequate predictor of the remaining article characteristics (see below).

B.1. Determining Regression Models Between Article Characteristics

Process analysis system 100 also includes regression module 104 operative to determine the regression model between selected article characteristics. As discussed above, display module 108 is operative to generate a graphical display of regression models and present them on display device 818. See FIG. 10. As FIG. 10 shows, the regression model may be plotted and displayed with (or optionally without) the underlying data points. In a preferred embodiment, regression module 104 computes regression models using "least squares" curve fitting methods. However, other methods can also be used. Although the various figures show a linear regression model, the regression model can be a linear, a non-linear (higher order polynomial) model or multi-variate.

The display of the relationship between two article characteristics in this manner provides useful information to process operators, design engineers and others associated with the design and manufacture of the article. The slope (steepness) of the regression line can be used to determine the relative sensitivity of article characteristics to changes in process settings. In addition, the slope (steepness) of the regression line can be used to identify article characteristics that will be more restrictive on (more sensitive to) the allowable range of process settings when specification limits are considered (see below).

B.1.a. Locating the Target Intersection

As discussed above, the design of an article generally results in a target value, as well as upper and lower specification limits, for each article characteristic (or at least the critical article characteristics). In one form, process analysis system 100 is operative to determine the intersection of the target values for a pair of article characteristics relative to the corresponding regression model. FIG. 4 illustrates an exemplary regression model display including the target intersection located relative to the regression model associated with a first (predictor, see below) characteristic and a second article characteristic.

As FIG. 4 illustrates, location of a target intersection allows for a visual and/or analytical determination of the direction and magnitude that the regression line is offset from the target intersection for each article characteristic. Moreover, as the regression model essentially represents all possible combination of process settings (that is, without changing a process input, such as changing the dimensions of a mold cavity), the resulting diagram allows one to determine whether producing a part having a given pair of article characteristics at target value is achievable.

In addition, as FIGS. 5 and 6 illustrate, the information provided by FIG. 4 facilitates the process of changing an aspect of the process (e.g., process inputs or control settings) to shift output closer to design target. For example, as FIG. 5 illustrates, the operator can change the combination of process control settings to shift the joint operating position closer to a desired point along the regression model. In one embodiment of the present invention, the process control settings can be changed to optimize the joint operating positions of more than two part characteristics. In addition, by changing process inputs, the regression line can be shifted to a position closer to the target intersection or shifted to a position such that the regression line passes through the target intersection. See FIG. 6. In one embodiment of the present invention, the process inputs can be changed to optimize the position of more than one regression line. Lastly, as FIG. 7 provides, changes in both process control settings and process inputs can be used to shift the part characteristic values closer to the target intersection. In one embodiment of the present invention, changes in both process control settings and process inputs can be changed to optimize more than two part characteristic values.

In one embodiment, an offset table is created based on how far the regression line is located from (offset from) the target intersection for each article characteristic. The offset is presented in three formats: in the X-direction, the Y-direction and the direction perpendicular to the regression line.

B.1.b. Specification Limits

Process analysis system 100 is also configured to locate the upper and lower specification limits for the Y-axis article characteristic relative to the regression model between the Y-axis article characteristic and an X-axis article characteristic. See FIG. 12. This graphical representation allows the ability to determine whether any of the Y-axis article characteristics are robust against changes to process variables. In such cases, the regression line will generally have a small slope and/or not intersect either the upper or lower Y-axis specification limits.

In addition, process analysis system 100 is also operative to locate the upper and lower specification limits for the X-axis article characteristic relative to the regression model. This representation allows one to determine whether the regression line passes through the acceptable region bounded by the four specification limits. In other words, this representation allows for a determination as to whether it is even possible, given the current process and process inputs, to manufacture the parts within specification limits. In addition, locating the specification limits relative to the regression model allows for a determination of the maximum and minimum values (and, therefore, range) for the X-axis characteristic that will yield articles where the Y-axis characteristic is within specification limits. This range determination allows a manufacturer, for example, to determine if the part is in compliance with the specification limits for both the X- and Y-axis characteristics only by measuring the X-axis characteristic. To compute the minimum X-axis article characteristic, process analysis system 100 computes the value of the X-axis article characteristic at which the regression model intersects the lower specification limit for the Y-axis characteristic. Similarly, to compute the maximum X-axis article characteristic, process analysis system 100 computes the value of the X-axis characteristic at which the regression model intersects the upper specification limit for the Y-axis characteristic. In either case, the X-axis characteristic can be no larger than the upper specification limit for X and can also be no smaller than the lower specification limit for X.

B.1.c. Prediction Intervals

As FIG. 8 shows, process analysis system 100 may also add upper and lower prediction intervals to the regression model diagram to allow for a determination of the magnitude of the variability about the regression model. In one embodiment, regression module 104 is further operative to compute upper and lower prediction intervals based on a set of article characteristic value pairs using known statistical methods. As FIG. 8 illustrates, locating the prediction intervals also allows for an evaluation of the variability relative to the target intersection. For example, the target intersection may lie outside of the prediction intervals on either the high or low side. In this case, it is virtually impossible to ever hit the target intersection given the same process inputs. For example, assuming that FIG. 8 models the relationship between two article characteristics resulting from an injection molding process, locating the target intersection reveals that use of the mold, in its current state, will not obtain a part on target as to the two article characteristics. Further, when the target intersection lies within the prediction intervals, the percentage of parts where the article characteristic is greater than target and less than target can be determined through the use of known statistical techniques.

Figure 13:
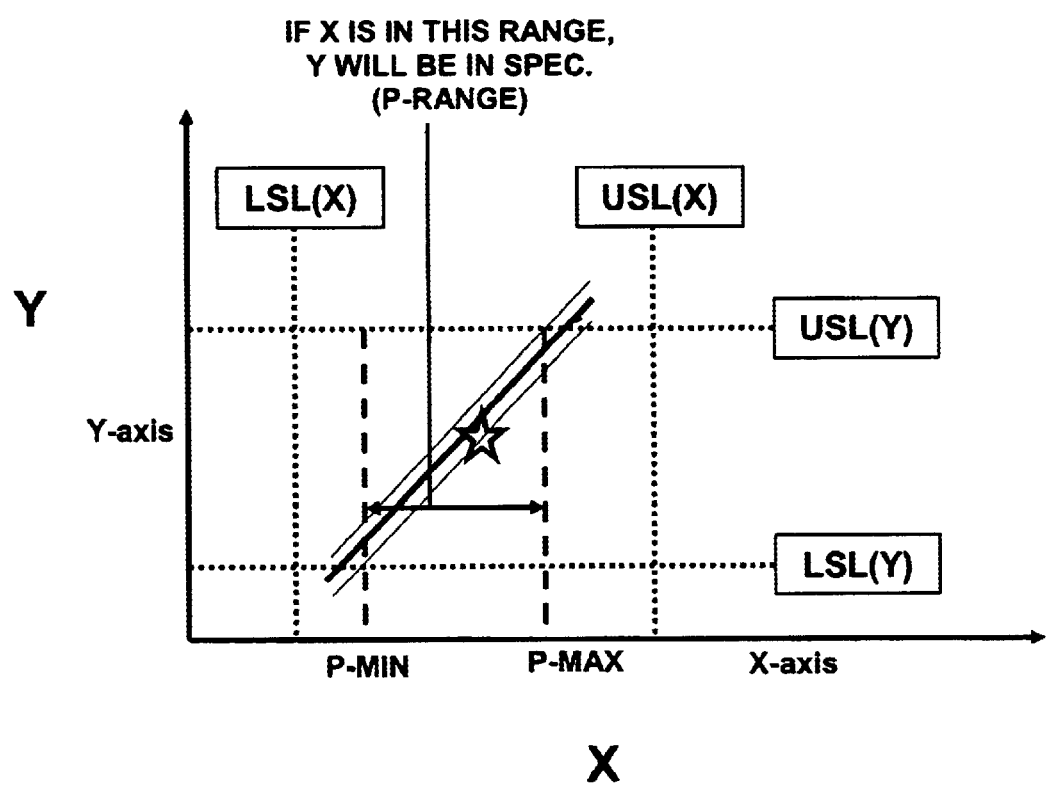
FIG. 13 is a scatter diagram including a linear regression model, prediction intervals, a target intersection, and upper and lower specification limits.

In addition, prediction intervals may also be used in the determination of minimum and maximum values for the X-axis characteristic (see Section II.B.1.b., supra). As FIG. 13 illustrates, to compute the minimum X-axis article characteristic, process analysis system 100 computes the value of the X-axis article characteristic at which the lower prediction interval intersects the specification limit for the Y-axis characteristic. Similarly, to compute the maximum X-axis article characteristic, process analysis system 100 computes the value of the X-axis characteristic at which the upper prediction interval intersects the upper specification limit for the Y-axis characteristic. In either case, the X-axis characteristic can be no smaller than its lower specification limit and no larger than its upper specification limit.

An embodiment of the present invention allows the user to determine the magnitude of the prediction intervals by inputting the percentage of area in the distribution that the user wants to have included in between the prediction intervals.

B.2. Predictor Characteristic

An embodiment of the present invention applies correlation and regression analysis to determine predictor characteristics in manufacturing processes. In one embodiment, a predictor characteristic is selected from the plurality of article characteristics associated with a part and used as the single X-axis characteristic. As discussed in more detail below, the predictor characteristic is chosen based on an assessment of the capability of a given article characteristic to be a predictor of other article characteristics. The selection of a predictor characteristic, therefore, reduces the number of article characteristic combinations that must be analyzed to a relatively small subset. For example, a part having 31 article characteristics would require analysis of over 900 relationships between article characteristics. The selection of a predictor characteristic reduces this 30 to combinations. In addition, the selection of a predictor characteristic can be used in a variety of ways to facilitate design, production, and measurement tasks associated with manufacturing. For example, a predictor characteristic can be used to greatly reduce the time and expense associated with measuring parts, as only the predictor characteristic needs to be measured during production to determine if all other article characteristics are within specification.

Figure 16:
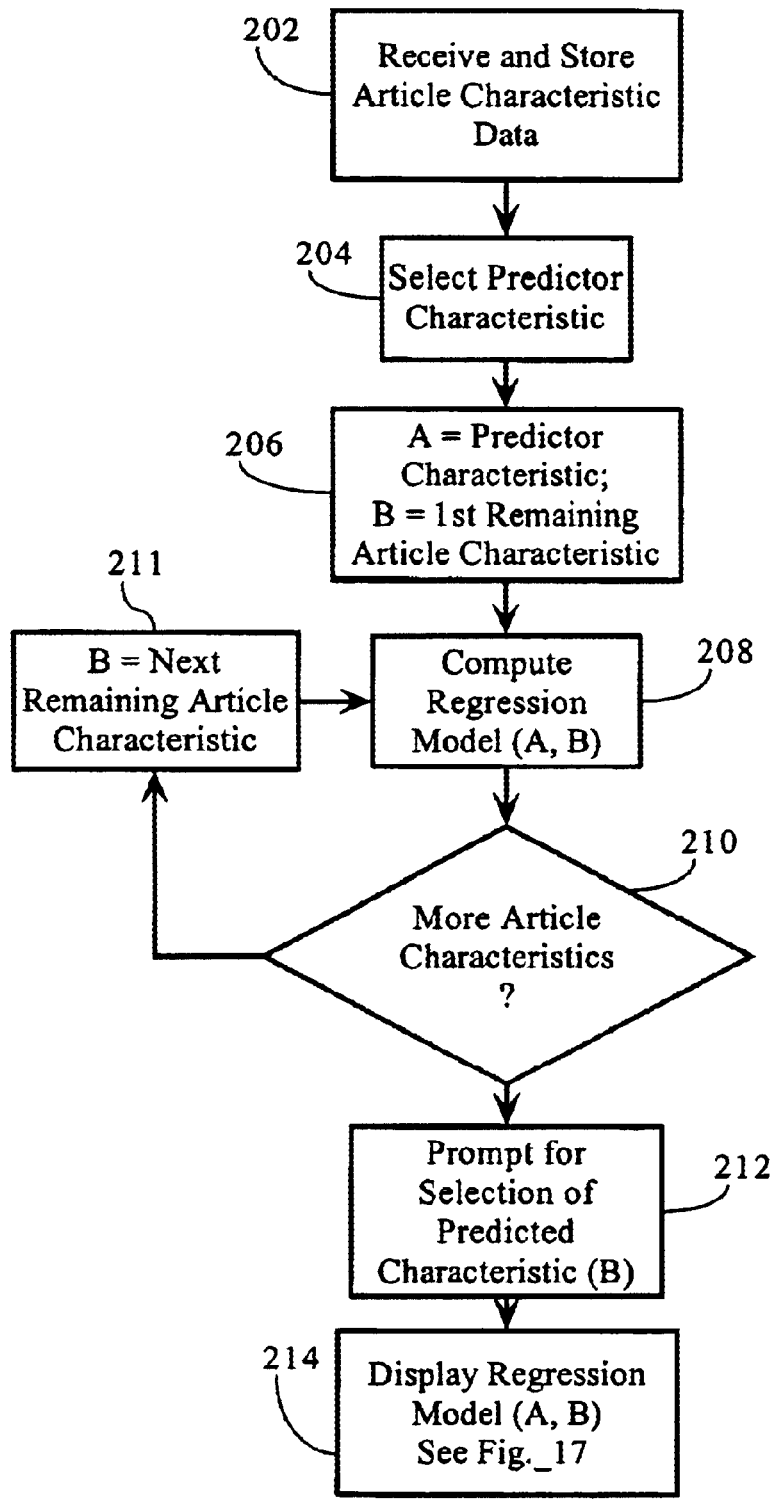
FIG. 16 is a flow chart providing a method according to an embodiment of the present invention.

FIG. 16 illustrates a method involving selection of a predictor characteristic according to an embodiment of the present invention. As discussed above, data input module 102 is operative to receive and store article characteristic data associated with a set of articles (e.g., article characteristic values and design targets/specification limits) (step 202). In one embodiment, correlation module 106, as discussed in more detail below, is operative to perform calculations (e.g., such as the determination of correlation coefficients between all combinations of article characteristics, computation of overall predictive capability of each article characteristic, etc.) to rank article characteristics according to their relative predictive capabilities. In one embodiment, display module 108 displays the ranked list of article characteristics and allows for selection of an article characteristic as the predictor characteristic (see step 204). As discussed below, a user may choose a predictor characteristic based on a number of considerations including relative predictive capability, feasibility/cost of measuring the article characteristic, etc. Still further, the selection of a predictor characteristic may be based on other methods (see below).

With a selected predictor characteristic, interface application module 110 directs regression module 104 to determine the regression model between the predictor characteristic (in one embodiment, as the x-axis characteristic) and all or a subset of the remaining article characteristics (see steps 206, 208, 210 and 211). When complete, the user is prompted to select a predicted article characteristic (step 212). Display module 108, in one embodiment, based on the equation defining the regression model, generates a graphical display of the regression model between the predictor characteristic and the selected predicted characteristic (step 214).

Figure 17:
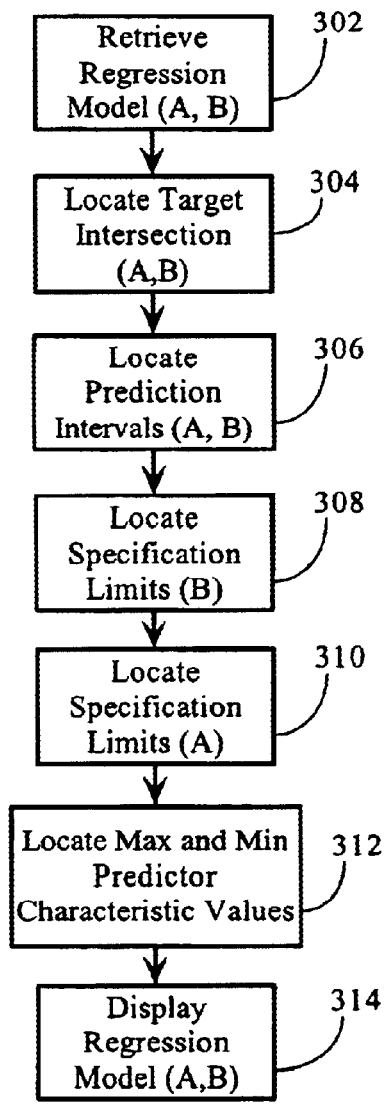
FIG. 17 is a flow chart diagram illustrating a method associated with displaying a regression model and associated analysis elements to a user.

In addition to the regression model, display module 108 is further operative to add additional features to the graphical representation presented to users. FIG. 17 illustrates a method for generating a graphical representation illustrating the relationship between a predictor characteristic and a predicted characteristic with additional features discussed above. Display module 108 retrieves the regression model between the selected predicted characteristic and the predictor characteristic (step 302). As FIG. 17 provides, display module 108 may also locate the intersection of the target values associated with the predictor and predicted characteristics relative to the regression model (step 304) (see Section II.B.1.a., supra). Display module 108 may also locate the predictions intervals associated with the regression model on the display (step 306) (see Section II.B.1.c., supra). Still further, display module 108 may locate the upper and lower specification limits associated with the predicted characteristic (step 308), as well as the upper and lower specification limits associated with the predictor characteristic (step 310). See Section II.B.1.b., supra. Display module 108 may also graphically illustrate the minimum and maximum values for the predicted characteristic based on the specification limits and, optionally, prediction intervals (step 312). See Sections II.B.1.b. & II.B.1.c., supra.

A variety of interface displays are possible. For example, the equation defining the regression model may be displayed to the user. Moreover, the maximum and minimum predictor characteristic values may be displayed to the user, as well as any other data associated with the article characteristics and/or the relationship between them. In one embodiment, the graphical user interface presented on display device 818 allows the user to select which of the above graphical elements to display.

B.2.a. Selecting Predictor Characteristic

The predictor characteristic can be selected using either a heuristic or a statistically-based approach. Moreover, the selection of a predictor characteristic may be based on a visual assessment of the correlations between article characteristics or an analytically-based assessment.

B.2.a.1. Graphical Selection

In one embodiment, a user can use the scatter diagrams to visually assess the degree of correlation, amounting to a visual estimation of the correlation coefficient for each scatter diagram. The closer the boundary or perimeter around the data points approaches a straight line, the higher the correlation coefficient. The exception to this general rule is for situations where the regression line is horizontal, or nearly so. See Section II.B., supra. The user can assess the scatter diagrams of all possible combinations of article characteristics. However, in another embodiment, the number of scatter diagrams used could be greatly reduced by picking one article characteristic to act as the foundational variable. Using the foundational variable as the X-axis variable, a scatter diagram would be then created for each remaining article characteristic, which would be plotted on the Y-axis. Picking the "foundational" (equivalent to the predictor) article characteristic can be based on looking at the "scatter" of the data, or can be randomly picked. While a visual assessment may be practical if a small number of article characteristics are involved, larger numbers of article characteristics, resulting in combinations into the thousands, requires (at least for practical purposes) the use of a computing device to analytically select the predictor characteristic.

B.2.a.2. Analytical Selection of Predictor Characteristic

Figure 18:
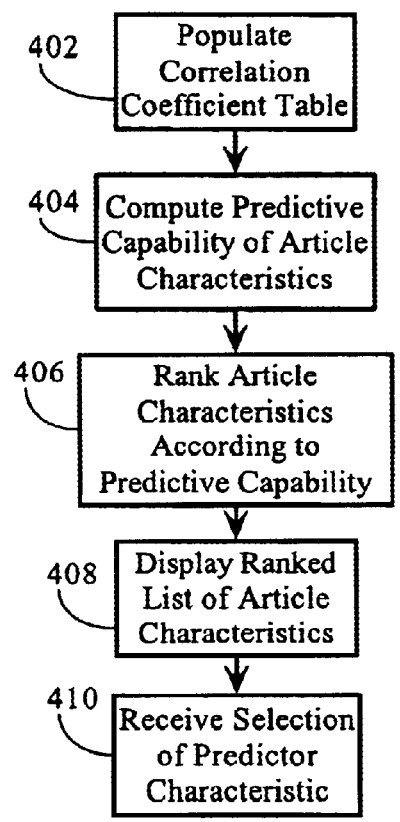
FIG. 18 is a flow chart setting forth a method allowing for selection of a predictor characteristic.

To facilitate selection of a predictor characteristic, in one embodiment, correlation module 108 calculates the correlation coefficients between all or a subset of the article characteristics; determines, based on the calculated correlation coefficients, a value indicating the predictive capability of a first article characteristic relative to all other article characteristics; and repeats this process for all or a subset of the article characteristics. FIG. 18 provides a method illustrating a process flow associated with selection of a predictor characteristic. As FIG. 18 shows, correlation module 106, as more fully described below, calculates the correlation coefficients between all or a selected subset of the article characteristics (based on a set of article characteristic values, see FIG. 19, Section A) and populates a correlation coefficient table (FIG. 19, Section B) (step 402). Correlation module 106 then computes a value indicating the relative predictive capability of each article characteristic (step 404). In one embodiment, this value is the average of the absolute values of the correlation coefficients for a given article characteristic (see FIG. 19, Section C). Of course, other methods for computing this value can be used, such as computing the average without absolute values, computing a weighted average, etc.

Correlation module 106 then ranks the article characteristics according to the values computed in step 404 (step 406). Display module 108 then displays the ranked list on display device 818 to allow the user to select a predictor characteristic based at least in part on the predictive capabilities of the article characteristics (step 408). According to one embodiment, the user makes his choice (step 410), causing interface application module 110 to direct regression module 104 to compute the regression models between the selected predictor characteristic and the remaining article (predicted) characteristics (see above).

The correlation coefficient table may be populated using any suitable process or technique. However, in a preferred embodiment, correlation module 106 executes the methodology described below.

B.2.a.3. Population of Correlation Coefficient Table

According to standard industry practice, the data for a single article characteristic (e.g., one dimension) is vertically arranged in a column. Thus, each column stores the data for one and only one article characteristic. The resulting measurement data array will, therefore, have as many columns as there are article characteristics. More often than not, the data is stored in an Excel spreadsheet, or other suitable file format.

With this convention, then, each column represents a different article characteristic. Each row represents the article characteristic data (multiple article characteristics) for a single part. In the case of injection molding, each row stores the data associated with a single press operating cycle. If the mold is a single-cavity mold, each row will contain measurement data for a single part. However, if the mold is a 4-cavity mold, each row stores the measurement data for all four parts produced during one machine cycle. Typically, the same article characteristics are measured for each part in a multi-cavity mold; however, there is no constraint that requires this.

In one embodiment, correlation module 106 includes functionality to determine the correlation coefficients (according to standard statistical methods) among all article characteristics, compute a value indicative of the predictive capability of each article characteristic, and rank the article characteristics according to their relative predictive capabilities.

FIG. 20 illustrates a method for populating the correlation coefficient table discussed above. As FIG. 20 shows, in one embodiment, correlation module 106 initializes a correlation coefficient table (step 502) and variables associated with the cell parameters of the table (A,B) (step 504) and the article characteristics (see steps 506 and 508). For didactic purposes, assume that correlation module 106 operates on the article characteristic values of FIG. 19, Section A. In one embodiment, correlation module 106 computes the correlation coefficient between the first article characteristic (X=1) and the second article characteristic (Y=2) based on the article characteristic values in the corresponding columns (step 510). Correlation module 106 then stores the computed correlation coefficient (in the example, 0.999232) in the upper left hand corner of the table (A=1, B=1) (step 512). Correlation module 106 then calculates the correlation coefficients between the first article coefficient (X=1) and the remaining coefficients (Y), increasing the row position (B) with each successive computation and store (see steps 514, 516 and 518).

After correlation module 106 reaches the last remaining article characteristic (step 514), it fetches the computed correlation coefficients in the first column (A=1), transposes the column into a row, shifts the row by one relative to the correlation coefficient table and stores the data in the appropriate cells of the table (step 518). Correlation module 106 then increments the cell column position (A=2) and the article characteristic identifiers (X=2) (step 522), (Y=3) (step 508) and sets the cell row position equal to the column position (B=2) (step 524). Correlation module 106 then computes the correlation coefficient between the second article characteristic (X=2) and the third article characteristic (Y=3; step 508) (step 510) and stores it in the appropriate cell (A=2, B=2) (step 512). Correlation module 106 repeats this process until the correlation coefficient between the second-to-last article characteristic value and the last article characteristic value has been computed and stored (see step 520). As FIG. 19 illustrates, the resulting columns of correlation coefficients, each column corresponding to an article characteristic, allows for relative easy computation of a value (e.g., an average) indicating the predictive capabilities of the article characteristics (see FIG. 19, section C).

As is apparent from the above-provided description, the process for populating the correlation coefficient table achieves a 50% reduction in the number of correlation coefficients that must be computed, because for every XY correlation, there is a corresponding YX correlation. It is also apparent that the compact notation of the correlation coefficient table greatly facilitates programming the subroutine that populates the table. If the computations were to be done with only two correlations in each row (XY and YX), there would be over 600 rows for 50 part characteristics.

The preceding method for populating the correlation coefficient table is one embodiment of the table population/compression algorithm. As previously mentioned, to maintain the usual and customary convention consistent with industry standards, the data for a single article characteristic is vertically arranged in a column. The methods described herein would function equally well if the data for a single article characteristic was horizontally arranged in a row and the algorithm was adapted for that data structure. For that case, the average correlation coefficient would be computed by taking the average of a row of correlation coefficients rather than a column.

B.2.a.4. Alternative Embodiment

In one embodiment, a user may use the functionality discussed above to complete the selection of a predictor characteristic and view the scatter diagrams with the predictor characteristic as the x-axis variable and including specification limits, and optionally prediction intervals. Based on such scatter diagrams, the user may select the predicted characteristics that are robust (insensitive to changes in process settings) and eliminate such article characteristics from the data set to eliminate "noise." This selection can also be accomplished analytically based on the slope and Y-intercept of the regression model, the location and slope of the prediction intervals and the value of the upper and lower specification limits for both the x-axis and y-axis variables. In one form, such article characteristics have prediction intervals that do not intersect the predicted article characteristic specification limits. In this context, they constitute "noise" in selection of a predictor characteristic.

The user then re-runs the selection of the best predictor based on the revised (reduced) data set.

B.2.b. Minimum and Maximum Values for Predictor Characteristic

Figure 12:
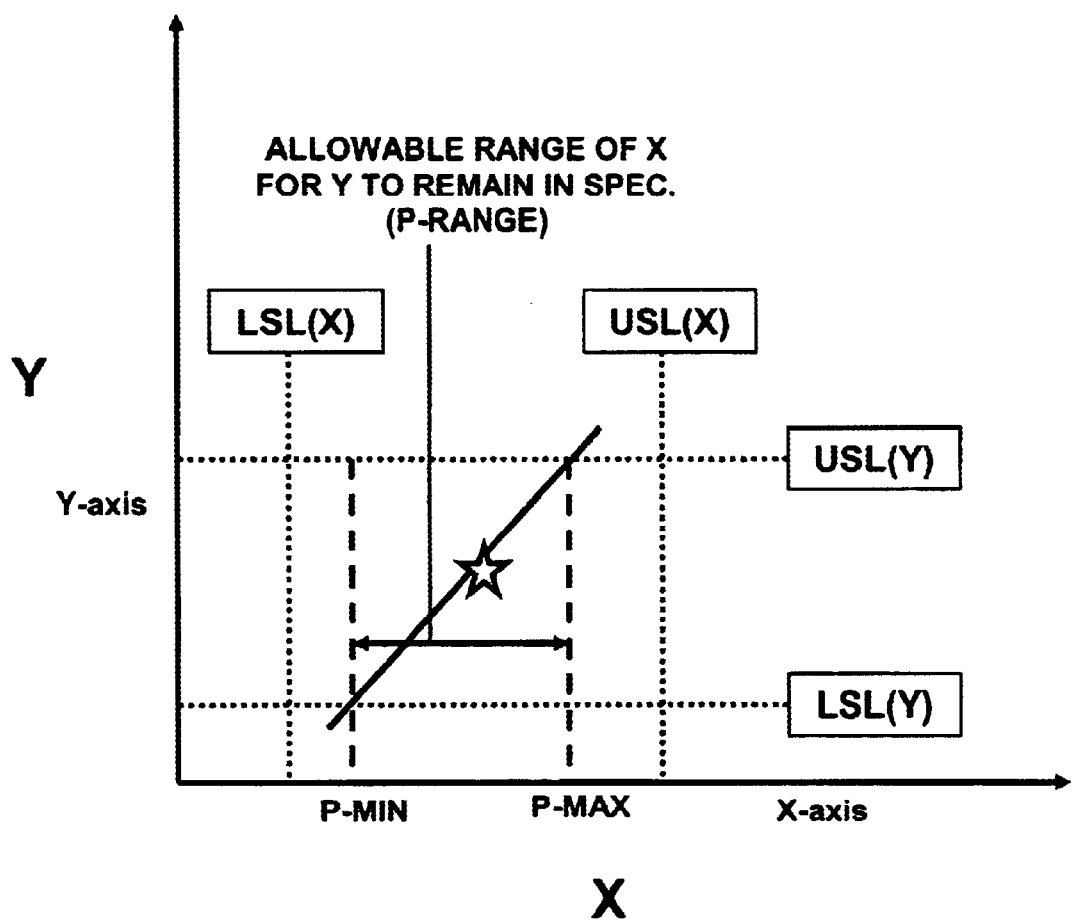
FIG. 12 is a scatter diagram illustrating the concepts associated with an embodiment of the present invention.

To facilitate understanding of an embodiment of the present invention, it is useful to consider a simple situation where there are only two article characteristics of interest. One of the article characteristics is selected as the predictor characteristic using methods described above. The regression model establishes the relationship between the predictor characteristic and the remaining article or predicted characteristic. This situation is illustrated in FIG. 12. The intersection of the regression model with the upper and lower specification limits of the predicted characteristic (Y) determine the values of the predictor characteristic (X) above which the predicted characteristic does not meet specification. See Section II.B.1.b., supra. The intersection between the regression model and the upper specification limit for Y is defined as P-max. See FIG. 12. The intersection between the regression model and the lower specification limit for Y is defined as P-min. It can readily be seen that as long as the predictor characteristic (X) is between the values of P-min and P-max, then the predicted characteristic must be within specification limits. For this regression model, where there is perfect correlation between the predictor characteristic and the predicted characteristic, it can definitively be said that if the predictor characteristic is greater than P-max or less than P-min, then the predicted characteristic will be outside its specification limits. Another way of expressing this is to define the distance between P-min and P-max as P-range. It can then be said that as long as the predictor characteristic is within P-range, then the predicted characteristic will be within specification.

Because the regression model seldom has a perfect degree of correlation, there is uncertainty in using one part characteristic to predict the other. The prediction intervals associated with the regression model place limits on the uncertainty associated with predicting one part characteristic given a value for the other part characteristic. FIG. 13 illustrates use of the prediction intervals associated with the regression model to remove the effect of such uncertainties. As FIG. 13 shows, two lines are shown located in the vicinity of and approximately parallel to the regression line. These lines are the upper and lower prediction intervals that more or less bound the data points around the regression line. For didactic purposes, the upper and lower prediction intervals are shown as being straight lines; in practice, however, they are generally curvilinear. As FIG. 13 provides, because of the scatter of the data points, the maximum allowable range for the predictor characteristic is more restricted. Specifically, the predictor characteristic can be no larger than the value associated with the intersection of the upper prediction interval and the upper specification limit for the predicted characteristic, or the upper specification limit for the predictor characteristic (whichever is smaller). In a similar fashion, the predictor characteristic can be no smaller than the value associated with the intersection of the lower prediction interval and the lower specification limit for the predicted characteristic, or the lower specification limit for the predictor characteristic (whichever is larger). In other words, P-max is the more constraining (smaller) of the upper specification limit for the predictor characteristic and the intersection of the upper prediction interval with the upper specification limit for the predicted characteristic. Similarly, P-min is the more constraining (larger) of the lower specification limit for the predictor characteristic or the intersection of the lower prediction interval with the lower specification limit for the predicted characteristic. As long as the predictor characteristic is between P-min and P-max, the predicted characteristic will be within its specification limits. In one embodiment, it can be a matter of judgment as to how "wide" the prediction intervals should be. In one embodiment, process analysis application 100 uses typical "width" parameters as a default setting. However, the user will have the option of overriding these default settings.

B.2.c. Constraint Table for Predictor Characteristic

As discussed above, the foregoing discussion in section II.B.2.b., supra, involved a simplified situation involving only two article characteristics. In actual practice, a given part often has a large number of article characteristics of interest. In one embodiment, process analysis system 100 is further operative to create a constraint table. A constraint table contains, for each predicted article characteristic, the minimum (P-min) and maximum (P-max) values for the predictor characteristic as determined above (see Sections II.B.1.b. & c., II.B.2.b., supra).

From the constraint table (see FIG. 22), the most constraining minimum (P-min*) and maximum (P-max*) values can be determined for the predictor characteristic. See FIG. 14. That is, the most constraining minimum value (P-min*) is the largest minimum value (P-min) in the constraint table, while the most constraining maximum value (P-max*) is the smallest maximum value (P-max) in the constraint table. FIG. 22 illustrates a constraint table according to an embodiment of the present invention, where "none" means that the upper or lower specification limit for the predictor characteristic is the most constraining value as to the corresponding article characteristic. Accordingly, with an identification of these most constraining minimum (P-min*) and maximum values (P-max*), a manufacturer can be confident that as long as the predictor characteristic lies between them, the remaining predicted characteristics will be within specification limits.

B.2.d. Determining Producibility Targets and Ranges

Figure 14:
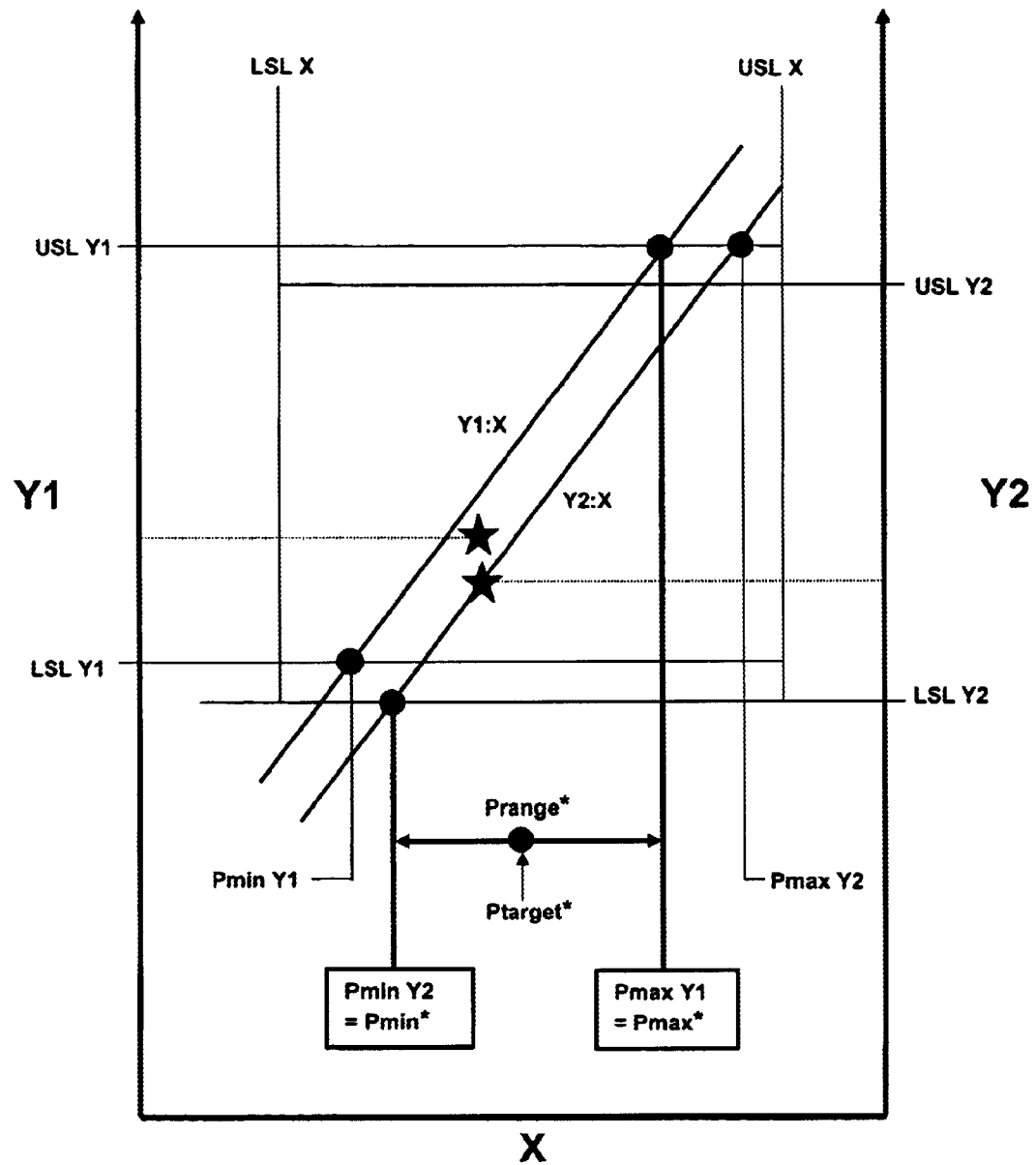
FIG. 14 is a scatter diagram illustrating the determination of the maximum allowable range and target value for a predictor characteristic.

Further parameters can be derived from P-min* and P-max* that will be useful for facilitating design of articles and process inputs and for setting process control variables. The maximum allowable range (P-range*) can be computed by subtracting the most constraining minimum value (P-min*) from the most constraining maximum value (P-max*). FIG. 14 graphically illustrates the determination of the most constraining minimum and maximum values and range for the simplified case of two predicted characteristics.

In addition, a predictor production target (P-target*) can be determined. P-target* is the point that one would pick as the target for the average output of the process. It is, in one embodiment, the best "producibility" point that will maximize the chances of producing parts that are in compliance with specification limits. When properly selected, P-target* will minimize the percentage of data points that are outside of P-range* during production.

To avoid confusion between design target and a target for the predictor dimension (P-target*), a difference in terminology should be noted. The predictor characteristic (P) will almost always have an engineering design target (P-target). The engineering design target (or nominal value) is a value called for by a design engineer (e.g., a number on a drawing or in a specification). In contrast, P-target* is a target operating point for the process that will optimize production output, as discussed above.

In one embodiment, the predictor production target (P-target*) is selected as the midpoint of P-range*. See FIG. 14. This would be appropriate for situations where the output of the production process was symmetrical about its mean. Typical processes have a symmetrical distribution that is approximately normal. If the distribution of the article characteristic is non-symmetrical, the target predictor characteristic value can be set to the average article characteristic value.

C. Using the Maximum Allowable Range (P-Range*) and the Predictor Production Target (P-Target*)

For didactic purposes, it will be useful to clarify and define certain parameters as follows:

1. P-range* is the maximum allowable range for the predictor characteristic. It is the range within which the predictor characteristic must be to ensure that the remaining part characteristics will remain in compliance with specification limits;
2. P-target* is the value of the predictor characteristic production target value. P-target* can be set at several values within P-range*. P-target* will usually be set at the midpoint of P-range*;
3. VAR is the range of variability of the predictor characteristic associated with actual process output under production conditions. It is determined by assessing production output;
4. X-BAR is the average value of the predictor characteristic under production conditions. It is determined by assessing production output;
5. P-target is the engineering design target value for the predictor characteristic. It is determined by the design engineer to optimize form, fit and function; and,
6. USL and LSL are the upper and lower specification limits for the predictor characteristic based on the engineering design tolerances. They are determined by the design engineer and typically consider a number of factors including history tolerances used by the organization, criticality of the part, capability of the manufacturing organization, and other factors.

Knowing the maximum allowable range (P-range*) for the predictor characteristic is extremely useful. The actual process output will exhibit a certain amount of variability (VAR) and there will be a value that represents the predictor characteristic average process output (X-BAR). Having this information facilitates changing at least one process control setting in a manner that maximizes the likelihood that the process generates parts that are in compliance with the specification.

If it has been decided that P-range* is too "constrained", then a second part characteristic can be measured to "open up" the "constraints" on P-range*.

There is also great utility in comparing the size of the actual process variability (VAR) for the predictor characteristic to the maximum allowable range (P-range*). The following situations are possible:

1. If the actual process variability (VAR) is greater the maximum allowable range (P-range*), then a portion of the parts produced by the process will always be out of compliance.
2. If the actual process variability (VAR) is equal to the maximum allowable range (P-range*) and the average process output (X-BAR) is centered within the maximum allowable range, then nearly all parts produced by the process will be in compliance, but there will be no room for error or for shifts in the process output.
3. If the actual process variability (VAR) is smaller than and lies within the maximum allowable range (P-range*), then nearly all parts will be in compliance and there will be a greater margin of safety against errors or shifts in process output.

The present invention creates, for situation number 3, an excellent opportunity for the process engineer to investigate shifting the average process output (X-BAR) closer to the engineering design target (P-target) for the predictor part characteristic.

There is also great utility in comparing the average process output (X-BAR) for the predictor characteristic to its production target (P-target*). The following situations are possible, assuming that the process output distribution is symmetrical and the predictor characteristic target value (P-target*) is set at the midpoint of its maximum allowable range:

1. The closer the average process output (X-BAR) for the predictor characteristic is to the predictor production target (P-target*), the greater the likelihood that the process will produce parts that are in compliance.
2. When the average process output (X-BAR) is equal to the predictor production target (P-target*), the chances are maximized that the process will produce parts that are in compliance.

Similar conclusions can be reached even if the process output distribution is not symmetrical. In this situation, P-target* should be set at the point where the tails of the distribution have equal areas outside of P-range*.

Thus, the present invention facilitates determining the difference between the average process output (X-BAR) and the predictor production target (P-target*). This difference establishes both the magnitude and the direction that the average process output (X-BAR) should be shifted. With this knowledge, it is then possible to adjust one or more process control settings to move the average process output along the regression line to or closer to the predictor production target (P-target*).

The present invention provides further utility. It now becomes possible to determine whether the actual process variability (VAR) is too large relative to the maximum allowable range (P-range*). If this is the case, then a first option is to reduce the process variation. A second option is to increase the magnitude of the design tolerances. A third option is to do some combination of the previous two alternatives. The present invention can greatly facilitate efficiency and cost savings by requiring that the various process capability analyses discussed in this section be performed only one time for only the predictor characteristic instead of the 30 or 40, or however many total part characteristics, involved.

Moreover, the constraint table values provide other useful information for the design engineer. For example, if the decision is made to increase the size of the design tolerances, the constraint table facilitates a prioritized determination to be made as to 1.) which specification limit (upper or lower) for 2.) which article characteristic is most constraining and should be the first to be relaxed. This step can be repeated as often as desired, working "outward" from the most constraining to the least constraining part characteristic. The design engineer can also assess the impact of relaxing each tolerance on product performance and factor this information into the decision-making process.

The present invention creates still more utility. The design engineer now has information that enables a study to be conducted that evaluates the tradeoff between product performance and producibility. In addition, the design engineer may also, if circumstances permit, change the design target to the determined predictor characteristic target (P-target*), and make changes elsewhere in the system to compensate (if compensation is even required, for the change in the design target).

To condense the next series of comments, P-range*, VAR, and TOL (the difference between the upper and lower specification limits), will be represented by A, B, and C. In a similar fashion, P-target*, X-BAR and P-target will be represented by X, Y, and Z. The present invention facilitates the following comparisons:

1. A versus B;
2. A versus C;
3. B versus C;
4. X versus Y;
5. X versus Z; and,
6. Y versus Z.

As previously noted, there is exceptionally valuable information that can be gained from these comparisons.

D. Application Overview and Summary

Figure 21:
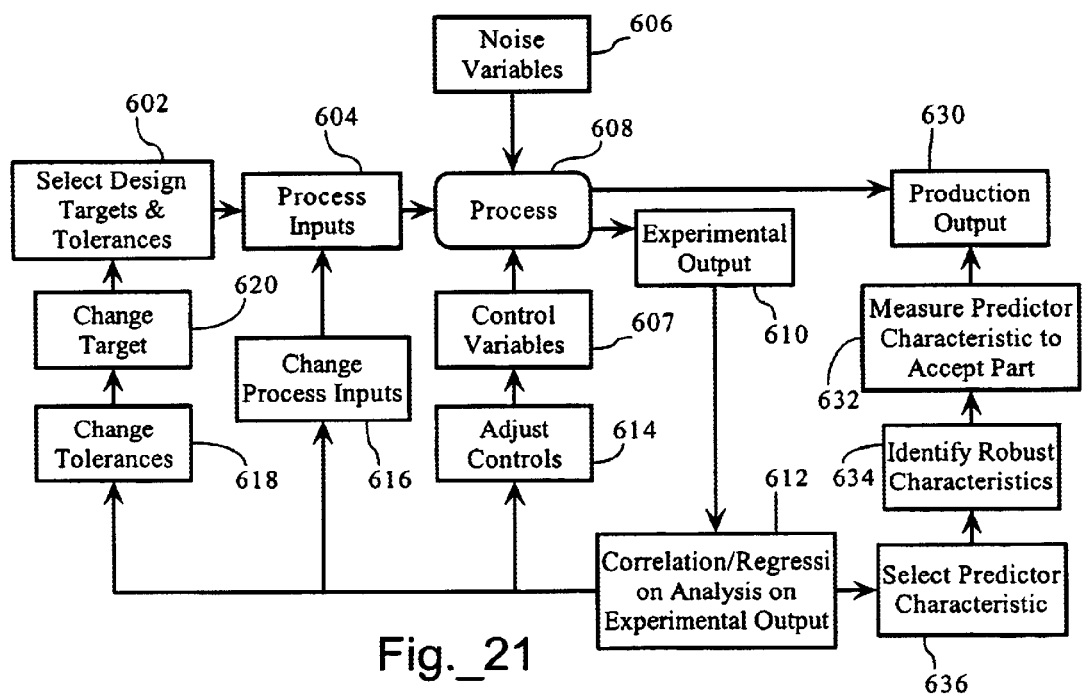
FIG. 21 is a flow chart diagram illustrating a method associated with use of the present invention according to one embodiment.

FIG. 21 summarizes the concepts discussed above and illustrates a method according to an embodiment of the present invention. For didactic purposes, an injection molding process is described. As FIG. 21 shows, the design of a part, for example, yields various design targets and specification limits for the article characteristics (602), which yields the design and fabrication of a mold including at least one cavity defining a part (604). Other inputs to the process include noise variables (606) and process control settings (607). The process (208) yields either experimental output (610) or production output (630), as discussed below.

As FIG. 21 shows, embodiments of the present invention can be used to facilitate the design and engineering processes associated with designing a part and/or engineering a process that will ultimately yield acceptable parts for production output. As discussed above, in one embodiment, a process operator generates a set of parts having a range of variation as to a plurality of article characteristics (experimental output 610). The article characteristics associated with the experimental output 610, or a sample thereof, are assessed and analyzed using the correlation and regression analysis methods discussed above (612). With the information gleaned from these analysis methods, the user may decide to change tolerance limits (618) and/or design targets (620). In addition, the user may decide to change process inputs (616) and/or adjust control variables (614).

As discussed above, in one embodiment, variation is induced in the part characteristics during an experimental production run. One of the by-products of that experimental production run is that the user learns which process settings have a major impact on the part characteristics. That knowledge enables the user to adjust a small number of process settings to position product output at any predetermined point along the regression model. In the case of injection molding, for example, the user may find that changing just one pressure setting, or one temperature setting, or one speed setting will be sufficient to translate the joint output of the article characteristics along the regression line.

Furthermore, the user may select a predictor characteristic (636) based on the correlation and regression analysis (612) to facilitate measurement of production output (630). For example, by analyzing the remaining article characteristics in relation to the predictor characteristic the user may identify robust predicted characteristics (i.e., article characteristics that will always be within tolerance limits) and eliminate them from measurement (step 634). Alternatively, or in conjunction therewith, the user may determine the maximum allowable range for the predictor characteristic and determine whether production output 630 complies with specification limits by measuring a single article characteristic (the predictor characteristic) (632).

As discussed above, to shift output along the regression line, an injection mold operator can change one or more process control variables, such as pressure, temperature, speed, etc. For illustrative purposes, an example of changing process inputs in the injection molding industry would be to change an internal dimension of a mold cavity. The regression line can be shifted vertically. In FIG. 6, this would be accomplished by changing the size of the remaining article characteristic. A reduction in size would be accomplished by adding material to the inside of the mold at the location of that article characteristic. This would decrease the size of the produced article and would shift the regression line vertically downwards. The size of the required shift would be computed by determining the distance the regression line was offset from the target intersection. Thus, the location of the regression line relative to the target intersection provides information that can be used to determine which direction the regression line needs to be shifted and the magnitude of that shift.

An alternate method of shifting the regression line in FIG. 6 would be to shift it horizontally. In order for the regression line to pass through the target intersection in FIG. 6, it must be shifted to the right. This shift would be accomplished by changing the mold dimension for the predictor characteristic. A shift to the right means that the size of the predictor characteristic is increased. An increase in size requires an increase in the size of the mold cavity for the predictor characteristic (here, a dimension). This can be accomplished by removing material from the interior of the mold. The size of the required shift is determined by computing the horizontal distance between the regression line and the target intersection.

Yet another method of shifting the regression line is to create the shift by changing some combination of mold dimensions for both the predictor and at least one of the remaining article characteristics. In the specific example shown in FIG. 6, the regression line is shifted in a direction perpendicular to itself. This, in effect, is the shortest possible shift that can be done to position the regression line through the target intersection. In this case, the shift would be accomplished by a decrease in the size of the predicted characteristic and an increase in the size of the predictor characteristic. In the case of a plated part, an example of the two article characteristics could be the post-plating length and width dimensions of the part. In this case, the pre-plating length and width dimensions of the part would be considered as the process inputs.

FIG. 7 illustrates a method used to produce articles that have characteristics that are superimposed on or congruent with the target intersection. The embodiment illustrated in FIG. 7 consists of a two-step process. In step one, the regression line is shifted so that it intersects the target intersection. In this example, the regression line is shifted down and to the right. As indicated before, the regression line can be shifted horizontally, vertically, or both. In step two, the characteristic position is shifted, for this particular example, along the regression line in the direction of smaller dimensions until the position is congruent with the target intersection. In practice, of course, the direction that the characteristic position will need to be shifted will depend on the location of the initial characteristic relative to the target intersection and the slope of the regression line.

For didactic purposes, the language contained in this application refers to the use of techniques to "locate" or "position" or "determine the intersection" or "determine the range" or other terminology that might be used from a graphical perspective. Virtually all analytical techniques described herein document can be accomplished either graphically or analytically. It is to be appreciated that analytical techniques can be used when graphical techniques are described and graphical techniques can be used when analytical techniques are described. Indeed, a preferred embodiment of the present invention performs all computations, calculations, locations and determinations using analytical techniques. Graphical displays are created for the convenience and understanding of the user.

Also for didactic purposes, the language in this application refers to a regression line. It is noted above that the regression "line" need not be a straight line but may be curvilinear. It should also be noted that the regression model is frequently shown, for didactic purposes, as being a single line. It should be noted the regression model in a preferred embodiment of this invention includes use of prediction intervals.

It is to be noted, that for didactic purposes, the effect of changes in process control settings has been illustrated in terms of their effect on a single remaining (predicted) article characteristic. It is to be understood that the effect of changes in process control settings can be determined for more than two article characteristics. Similarly, it is to be understood that the effect of changes in process inputs has been illustrated in terms of their effect on a single regression model. It is to be understood that the effect of changes in process control settings can be determined for than one regression model.

For didactic purposes, it has been assumed that the objective of introducing changes in either the process control settings and/or process inputs has been to move the joint operating position(s) and/or regression model(s) closer to one or more target intersections. It is to be further understood that these changes can be made to move the joint operating position(s) and/or regression model(s) to any desired position.

Finally, for didactic purposes, as noted immediately above, it has been assumed that changes have been introduced to optimize article characteristics relative to one or more criteria. It is to be understood that the algorithms, models and concepts set forth herein can be used to achieve the opposite effect. For example, it is possible to determine the required change in a joint operating point and/or regression model position needed in order to achieve a desired change in a process setting and/or process input. One objective of doing this could be to move a process control setting away from a dangerous or harmful setting. Another objective of doing this could be to match the production process and/or engineering design parameters to specific process inputs such as pre-configured raw material shapes.

Lastly, although the present invention has been described as operating in connection with injection molding processes, the present invention, as discussed above, has application to a variety of processes. For example, the present invention has application to plating and semiconductor manufacturing, as well as any other process where a material is added, removed, or changed in form or structure. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating design and manufacturing processes, the method comprising receiving a plurality of article characteristic values associated with a set of articles having a range of variation as to a plurality of article characteristics resulting from a process;

selecting a predictor characteristic from the plurality of article characteristics; and, determining the regression model(s) between the predictor characteristic and at least one of the remaining article characteristics in the plurality of article characteristics.

2. The method of claim 1 further comprising receiving a target value for the predictor characteristic and a target value for at least one remaining article characteristic;

determining the intersection of the target value for the predictor characteristic and the target value of a first remaining article characteristic relative to the regression model between the predictor characteristic and the first remaining article characteristic.

3. The method of claim 1 further comprising determining the respective upper and lower prediction intervals associated with the regression model(s) between the predictor characteristic and at least one of the remaining article characteristics.

4. The method of claim 2 further comprising determining the respective upper and lower prediction intervals associated with the regression model(s) between the predictor characteristic and at least one of the remaining article characteristics.

5. The method of claim of 4 further comprising receiving lower and upper specification limits for the predictor characteristic and at least one of the remaining article characteristics;

locating the lower and upper specification limits associated with said at least one remaining article characteristic;

locating the upper and lower specification limits associated with the predictor characteristic.

6. The method of claim 1 further comprising receiving lower and upper specification limits for at least one of the remaining article characteristics;

locating the lower and upper specification limits associated with at least one remaining article characteristic relative to the regression model between the predictor characteristic and said at least one remaining article characteristic.

7. The method of claim 6 further comprising determining the value of the predictor characteristic at which the corresponding regression model intersects the upper specification limit for at least one remaining article characteristic.

8. The method of claim 6 or 7 further comprising determining the value of the predictor characteristic at which the corresponding regression model intersects the lower specification limit for at least one remaining article characteristic.

9. The method of claim 3 further comprising receiving lower and upper specification limits for at least one of the remaining article characteristics;

locating the specification limits associated with said at least one remaining article characteristic relative to the regression model between the predictor characteristic and said at least one remaining article characteristic.

10. The method of claim 9 further comprising determining the value of the predictor characteristic at which the upper prediction interval associated with the regression model between the predictor characteristic and said at least one remaining article characteristic intersects the upper specification limit for said at least one remaining article characteristic.

11. The method of claim 9 or 10 further comprising
determining the value of the predictor characteristic at which the lower prediction interval associated with the regression model between the predictor characteristic and said at least one remaining article characteristic intersects the lower specification limit for said at least one remaining article characteristic.

12. The method of claim 6 further comprising
receiving the lower and upper specification limits for the predictor characteristic; and
locating the upper and lower specification limits associated with the predictor characteristic.

13. The method of claim 8 further comprising
receiving the lower and upper specification limits for the predictor characteristic; and
locating the upper and lower specification limits associated with the predictor characteristic.

14. The method of claim 3 further comprising
receiving lower and upper specification limits for said at least one of the remaining article characteristics;
locating the lower and upper specification limits associated with said at least one of the remaining article characteristics;
receiving lower and upper specification limits for the predictor characteristic;
locating the upper specification limit associated with the predictor characteristic; and determining a maximum article characteristic value for the predictor characteristic by selecting the lesser of (1) the upper specification limit for the predictor characteristic and (2) the value of the predictor characteristic at which the upper prediction interval intersects the upper specification limit for said at least one remaining article characteristic.

15. The method of claim 14 further comprising
repeating the determining a maximum article characteristic value step for a desired number of remaining article characteristics in the plurality of article characteristics; and
determining the most constraining maximum article characteristic value for the predictor characteristic by selecting the lowest maximum article characteristic value.

16. The method of claim 14 further comprising
receiving lower and upper specification limits for at least one of the remaining article characteristics;
locating the lower specification limit associated with the predictor characteristic; and
determining a minimum article characteristic value for the predictor characteristic by selecting the greater of (1) the lower specification limit for the predictor characteristic and (2) the value of the predictor characteristic at which the lower prediction interval intersects the lower specification limit for said at least one remaining article characteristic.

17. The method of claim 16 further comprising
determining an allowable range for the predictor characteristic subtracting the minimum article characteristic value from the maximum characteristic value.

18. The method of claim 16 further comprising
repeating the determining a minimum article characteristic value step for a desired number remaining article characteristics in the plurality of article characteristics; and
determining the most constraining minimum article characteristic value for the predictor characteristic by selecting the greatest minimum article characteristic value.

19. The method of claim 18 further comprising
determining the maximum allowable range for the predictor characteristic by subtracting the most constraining minimum article characteristic value from the most constraining maximum characteristic value.

20. The method of claim 19 further comprising
determining the target manufacturing value for the predictor characteristic by selecting a value between the most constraining minimum and maximum article characteristic values for the predictor characteristic.

21. The method of claim 19 further comprising
determining the target manufacturing value for the predictor characteristic by selecting the midpoint value between the most constraining minimum and maximum values for the predictor characteristic.

22. The method of claim 21 further comprising
receiving a target value for the predictor characteristic and a target value for at least one remaining article characteristic;
determining the intersection of the target value for the predictor characteristic and the target value of a first remaining article characteristic relative to the regression model between the predictor characteristic and the first remaining article characteristic.

23. The method of claim 1 wherein the selecting step comprises
selecting the predictor characteristic based at least in part on an assessment of the capability of each article characteristic to be predictive of all or a subset of the article characteristics in the plurality of article characteristics.

24. The method of claim 23 wherein the selecting step comprises
calculating the correlation coefficients between all or a subset of the article characteristics;
determining, based on the calculated correlation coefficients, a value indicating the predictive capability of a first article characteristic relative to all other article characteristics;
repeating the determining step for said all or a subset of the article characteristics; and
selecting a predictor characteristic based at least in pare on the values indicating the predictive capabilities of the article characteristics.

25. The method of claim 24 wherein the predictor characteristic is selected as the article characteristic associated with the value indicating the highest predictive capability.

26. The method of claim 24 further comprising
ranking the article characteristics based on the values computed in the determining step.

27. The method of claim 24 wherein the determining step comprises
calculating the average correlation coefficient for each article characteristic.

28. The method of claim 24 wherein the determining step comprises
calculating the average of the absolute values of the correlation coefficients for each article characteristic.

29. The method of claim 23 wherein the predictor characteristic is selected based on a graphical determination of the article characteristic having the greatest predictive capabilities.

30. The method of claim 23 wherein selection of the predictor characteristic is further based on factors associated with assessing each article characteristic.

31. The method of claim 30 wherein the factors comprise the economic factors associated with assessing each article characteristic.

32. The method of claim 30 wherein the factors comprise the technical factors associated with assessing each article characteristic.

33. The method of claim 28 further comprising
ranking the article characteristics based on the values computed in the determining step; and
wherein selection of the predictor characteristic is further based on economic or technical factors associated with assessing each article characteristic.

34. A method facilitating design and manufacturing processes, the method comprising
receiving a plurality of article characteristic values associated with a set of articles having a range of variation as to a plurality of article characteristics resulting from a process;
determining the regression model(s) between a first article characteristic and at least one remaining article characteristic in the plurality of article characteristics:
receiving a target value for the first article characteristic and a target value for said at least one of the remaining article characteristic; and
determining the intersection between the target value for the first article characteristic and a target value for said at least one remaining article characteristic.

35. The method of claim 34 wherein regression models are determined for all possible combinations of article characteristics in the plurality of article characteristics.

36. The method of claim 34 wherein regression models are determined for a subset of all possible combinations of article characteristics in the plurality of article characteristics.

37. The method of claim 34,35 or 36 further comprising
displaying the regression model(s) on a user interface display.

38. The method of claim 37 wherein the regression model(s) are graphically displayed in scatter diagrams on the user interface display.

39. The method of claim 34 further comprising
receiving the lower and upper specification limits for said at least one remaining article characteristics;
locating the specification limits associated with said at least one remaining article characteristic.

40. The method of claim 39 further comprising
receiving the lower and upper specification limits for the first article characteristic;
locating the lower and upper specification limits rot the first article characteristic.

41. The method of claim 39 further comprising
(a) determining the value of the first article characteristic at which the regression model intersects the upper specification limit for said at least one remaining article characteristic.

42. The method of claim 39 or 41 further comprising
determining the value of the first article characteristic at which the regression model intersects the lower specification limit for said at least one remaining article characteristic.

43. The method of claim 41 further comprising
repeating the determining step (a) for a desired number of remaining article characteristics; and
determining the most constraining maximum value for the first article characteristic by selecting the lowest value of the first article characteristic associated with the determining step (a).

44. The method of claim 43 further comprising
(b) determining the value of the first article characteristic at which the regression model intersects the lower specification limit for said at least one remaining article characteristic;
repeating the determining step for a desired number of remaining article characteristics; and
determining the most constraining minimum value for the first article characteristic by selecting the greatest value of the first article characteristic associated with the determining step (b).

45. The method of claim 44 further comprising
determining the target manufacturing value for the first characteristic by selecting the midpoint between the most constraining minimum and maximum values for the first article characteristic.

46. The method of 44 further comprising
determining the maximum allowable range for the first article characteristic by subtracting the most constraining minimum value for the first article characteristic from the most constraining maximum value for the first article characteristic.

47. The method of claim 44 further comprising
determining the target manufacturing value for the first characteristic by selecting a value between the most constraining minimum and maximum values for the first article characteristic.

48. The method of claim 41 further comprising
receiving the lower and upper specification limits for die first article characteristic; and
locating the lower and upper specification limits associated with the first article characteristic;
repeating the determining step (a) for a desired number of remaining article characteristics; and
determining the most constraining maximum value for the first article characteristic by selecting the lower of (1) the upper specification limit For the first article characteristic and (2) the lowest value computed in the determining step (a).

49. The method of claim 47 farther comprising
(b) determining the value of the first article characteristic at which the regression model intersects the lower specification limit for said at least one remaining article characteristic;
repeating the determining step (b) for a desired number of remaining article characteristics; and
determining the most constraining minimum value for the first article characteristic by selecting the greater of (1) the lower specification limit for the first article characteristic and (2) the greatest value of the first article characteristic computed in the determining step (b).

50. A method facilitating design and manufacturing processes, the method comprising
receiving a plurality of article characteristic values associated with a set of articles having a range of variation as to a plurality of article characteristics resulting from a process;
determining a first regression model between a first article characteristic and a second article characteristic;
determining at least a second regression model between the first article characteristic and at least one of the remaining article characteristics; and, facilitating a comparison between the regression models.

51. The method of claim 50 wherein regression models are determined for all possible combinations of article characteristics in the plurality of article characteristics.

52. The method of claim 50 wherein regression models are determined for a subset of all possible combinations of article characteristics in the plurality of article characteristics.

53. The method of claim 50, 51, or 52 further comprising displaying the regression model(s) on a user interface display.

54. The method of claim 53 wherein the regression models are graphically displayed in scatter diagrams on the user interface display.

55. The method of claim 50 further comprising
receiving a target value as to at least two article characteristics;
as to a first article characteristic and a second article characteristic, locating the intersection of the target values of the first and second article characteristics relative to the regression model associated with the first and second article characteristics.

56. The method of claim 55 further comprising
As to the first article characteristic and a third article characteristic, locating the intersection of the target values of the first and third article characteristics relative to the regression model associated with the first and third article characteristics.

57. The method of claim 50 further comprising
receiving the lower and upper specification limits for the second article characteristic and a third article characteristic;
locating the specification limits associated with the second article characteristic relative to the regression model between the first article characteristic and the second article characteristic;
locating the specification limits associated with the third article characteristic relative to the regression model between the third article characteristic and the first article characteristic.

58. The method of claim 56 further comprising
receiving the lower and upper specification limits for the first article characteristic;
locating the specification limits for the first article characteristic relative to the regression model between the first article characteristic and the second article characteristic; and
locating the specification limits for the first article characteristic relative to the regression model between the first article characteristic and the third article characteristic.

59. A method facilitating design and manufacturing processes associated with the production of an article, the article having a plurality of article characteristics, at least two of the article characteristics having a target value and upper and lower specification limits, the method comprising
generating a set of articles having a range of variation as to a plurality of article characteristics resulting from a process;
assessing the set of articles as to all or a subset of the plurality of article characteristics;
selecting a predictor characteristic from the plurality of article characteristics; and,
determining the regression model(s) between the predictor characteristic and at least one of the remaining article characteristics in the plurality of article characteristics.

60. The method of claim 59 further comprising
determining the intersection of the target value for the predictor characteristic and the target value of at least one remaining article characteristic relative to the regression model between the predictor characteristic and said at least one remaining article characteristic.

61. The method of claim 59 further comprising
determining the respective upper and lower prediction intervals associated with the regression model between the predictor characteristic and said at least one of the remaining article characteristics.

62. The method of claim 60 further comprising
determining the respective upper and lower prediction intervals associated with the regression model(s) between the predictor characteristic and said at least one of the remaining article characteristics.

63. The method of claim of 62 further comprising
locating the lower and upper specification limits associated with said at least one remaining article characteristic;
locating the upper and lower specification limits associated with the predictor characteristic.

64. The method of claim 59 further comprising
locating the specification limits associated with said at least one remaining article characteristic.

65. The method of claim 64 further comprising
determining the value of the predictor characteristic at which the regression model intersects the upper specification limit for said at least one remaining article characteristic.

66. The method of claim 64 or 65 further comprising
determining the value of the predictor characteristic at which the regression model intersects the lower specification limit for said at least one remaining article characteristic.

67. The method of claim 61 further comprising
locating the specification limits associated with said at least one remaining article characteristic.

68. The method of claim 67 further comprising
determining the value of the predictor characteristic at which the upper prediction interval associated with the regression model between the predictor characteristic and said at least one remaining article characteristic intersects the upper specification limit for said at least one remaining article characteristic.

69. The method of claim 67 or 68 further comprising
determining the value of the predictor characteristic at which the lower prediction interval associated with the regression model between the predictor characteristic and said at least one remaining article characteristic intersects the lower specification limit for said at least one remaining article characteristic.

70. The method of claim 64 further comprising
locating the upper and lower specification limits associated with the predictor characteristic.

71. The method of claim 66 further comprising
locating the upper and lower specification limits associated with the predictor characteristic.

72. The method of claim 61 further comprising
locating the lower and upper specification limits associated with said at least one remaining article characteristic,
locating the upper specification limit associated with the predictor characteristic; and determining a maximum article characteristic value for the predictor characteristic by selecting the lesser of (1) the upper specification limit for the predictor characteristic and (2) the value of the predictor characteristic at which the upper prediction interval intersects the upper specification limit for said at least one remaining article characteristic.

73. The method of claim 72 further comprising repeating the determining a maximum article characteristic value step for a desired number of remaining article characteristics in the plurality of article characteristics; and determining the most constraining maximum article characteristic value for the predictor characteristic by selecting the lowest maximum article characteristic value.

74. The method of claim 72 further comprising locating the lower specification limit associated with the predictor characteristic; and determining a minimum article characteristic value for the predictor characteristic by selecting the greater of (1) the lower specification limit for the predictor characteristic and (2) the value of the predictor characteristic at which the lower prediction interval intersects the lower specification limit for said at least one remaining article characteristic.

75. The method of claim 74 further comprising determining an allowable range for the predictor characteristic by subtracting the minimum article characteristic value from die maximum characteristic value.

76. The method of claim 74 further comprising repeating the determining a minimum article characteristic value step for a desired number of remaining article characteristics; and determining the most constraining minimum article characteristic value for the predictor characteristic by selecting the greatest minimum article characteristic value.

77. The method of claim 76 further comprising determining the maximum allowable range for the predictor characteristic by subtracting the most constraining minimum article characteristic value from the most constraining maximum characteristic value.

78. The method of claim 76 further comprising determining the target manufacturing value for the predictor characteristic by selecting a value between the most constraining minimum and maximum values for the predictor characteristic.

79. The method of claim 76 further comprising determining the target manufacturing value for the predictor characteristic by selecting the midpoint value between the most constraining minimum and maximum values for the predictor characteristic.

80. The method of claim 79 determining the intersection of the target value for the predictor characteristic and the target value of at least one remaining article characteristic relative to the regression model between the predictor characteristic and said at least one remaining article characteristic.

81. The method of claim 59 wherein the selecting step comprises selecting the predictor characteristic based at least in part on an assessment of the capabilities of each article characteristic to be predictive of the other article characteristics in the plurality of article characteristics.

82. The method of claim 81 wherein the selecting step comprises calculating the correlation coefficients between all or a subset of the article characteristics;

determining, based on the calculated correlation coefficients, a value indicating the predictive capability of a first article characteristic relative to all other article characteristics;

repeating the determining step for all article characteristics; and selecting a predictor characteristic based at least in part on the values indicating the predictive capabilities of the article characteristics.

83. The method of claim 82 wherein the predictor characteristic is selected as the article characteristic associated with the value indicating the highest predictive capability.

84. The method of claim 82 further comprising ranking the article characteristics based on the values computed in the determining step.

85. The method of claim 82 wherein the determining step comprises calculating the average correlation coefficient for each article characteristic.

86. The method of claim 82 wherein the determining step comprises calculating the average of the absolute values of the correlation coefficients for each article characteristic.

87. The method of claim 81 wherein the predictor characteristic is selected based on a graphical determination of the article characteristic having the greatest predictive capabilities.

88. The method of claim 81 wherein the selection of the predictor characteristic is further based on factors associated with assessing each article characteristic.

89. The method of claim 88 wherein the factors comprise the economic factors associated with assessing each article characteristic.

90. The method of claim 88 wherein the factors comprise the technical factors associated with assessing each article characteristic.

91. A method facilitating design and manufacturing processes, the method comprising generating a set of articles having a range of variation as to a plurality of article characteristics resulting from a process;

assessing the degree of correlation between the article characteristics; and, selecting a predictor characteristic from the plurality of article characteristics based on the assessing step.

92. The method of claim 91 further comprising determining a maximum allowable range for the predictor characteristic; and, subsequent to the determining step, verifying that subsequently generated articles comply with at least one design specification associated with said articles based on assessment of the predictor characteristic.

* * * * *

UNITED STATES PATENT AND TRADEMARK OFFICE
CERTIFICATE OF CORRECTION

PATENT NO. : 7,072,808 B2
APPLICATION NO. : 10/067704
DATED : July 4, 2006
INVENTOR(S) : Tuszynski Page 1 of 1

It is certified that error appears in the above-identified patent and that said Letters Patent is hereby corrected as shown below:

Column 28, line 47, change "pare" to --part--

Column 29, line 24, change ":" to --;--

Column 29, line 53, change "rot" to --for--

Column 30, line 33, change "die" to --the--

Column 30, line 45, change "farther" to --further--

Column 33, line 31, change "die" to --the--

Signed and Sealed this

Twentieth Day of February, 2007

JON W. DUDAS
*Director of the United States Patent and Trademark Office*